United States Patent
Shigeta et al.

(10) Patent No.: US 8,230,264 B2
(45) Date of Patent: Jul. 24, 2012

(54) SYSTEM EVALUATION APPARATUS

(75) Inventors: Soichi Shigeta, Kawasaki (JP); Yuji Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/582,873

(22) Filed: Oct. 21, 2009

(65) Prior Publication Data
US 2010/0115342 A1 May 6, 2010

(30) Foreign Application Priority Data
Nov. 4, 2008 (JP) ................................. 2008-282700

(51) Int. Cl.
*G06F 11/00* (2006.01)
(52) U.S. Cl. ........... 714/37; 74/25; 74/26; 74/27; 74/33; 74/48
(58) Field of Classification Search ................... 714/25, 714/26, 27, 33, 37, 48
See application file for complete search history.

(56) References Cited

U.S. PATENT DOCUMENTS

| 5,634,098 | A | * | 5/1997 | Janniro et al. | 714/38 |
| 6,195,765 | B1 | * | 2/2001 | Kislanko et al. | 714/38 |
| 2006/0184937 | A1 | | 8/2006 | Abels et al. | |
| 2007/0083630 | A1 | * | 4/2007 | Roth et al. | 709/223 |
| 2007/0083631 | A1 | * | 4/2007 | Maccaux | 709/223 |
| 2008/0244525 | A1 | * | 10/2008 | Khalil et al. | 717/124 |
| 2010/0100880 | A1 | * | 4/2010 | Shigeta et al. | 718/1 |
| 2010/0100881 | A1 | * | 4/2010 | Shigeta et al. | 718/1 |

FOREIGN PATENT DOCUMENTS

| JP | 4-195436 | 7/1992 |
| JP | 2006-221649 | 8/2006 |
| JP | 2007-299425 | 11/2007 |

* cited by examiner

*Primary Examiner* — Charles Ehne
(74) *Attorney, Agent, or Firm* — Staas & Halsey LLP

(57) ABSTRACT

An apparatus for evaluating a change of an existing system to a modified system by using a test system including a subsystem having the same configuration with either of the existing subsystem and the modified system includes: a memory for storing configuration information of the test system and test information; and a processor for executing a process including: activating the test system to execute test on the subsystem, collecting test information from the test system, and storing the test result information while the subsystem has the same configuration as the existing system; confirming the test system has been modified; and activating the test system to execute test on the subsystem, collecting test result information from the test system, and storing the test result information while the subsystem has the same configuration as the modified system.

11 Claims, 30 Drawing Sheets

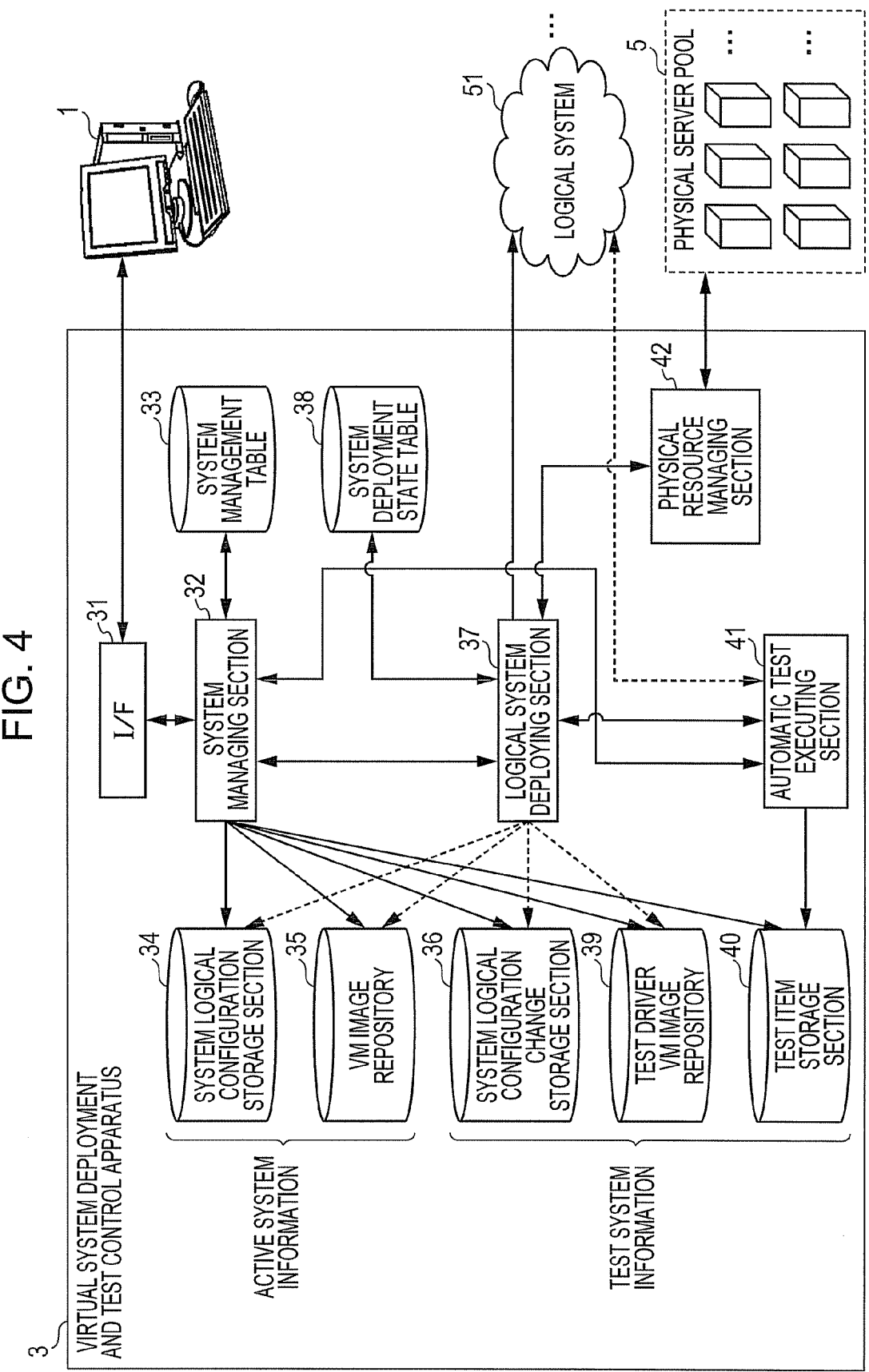

FIG. 5

| SYSTEM NAME | CONFIGURATION INFORMATION ON OPERATION-RELATED SYSTEM | | CONFIGURATION INFORMATION ON TEST SYSTEM | | |
|---|---|---|---|---|---|
| | NAME OF LOGICAL CONFIGURATION DEFINITION FILE | NAME OF VM IMAGE FILE | NAME OF LOGICAL CONFIGURATION DEFINITION FILE | TEST DRIVER NAME OF VM IMAGE FILE | NAME OF TEST ITEM FILE |
| A | SysA.xml | A-Web.img<br>A-DB.img | SysA-OperationTest.xml<br>SysA-FunctionTest.xml<br>SysA-LoadTest.xml | A-TestClient-1.img<br>A-TestClient-2.img | A-OperationTest.test<br>A-FunctionCoverTest.test<br>A-LoadTest.test |
| X | SysX.xml | X-Web.img<br>X-DB.img | X-OperationTest.xml<br>X-FunctionTest.xml<br>X-LoadTest.xml | X-TestDB.img<br>X-TestClient.img | X-OperationTest.test<br>X-FunctionCoverTest.test<br>X-LoadTest.test |
| ... | ... | ... | ... | ... | ... |

FIG. 6

| NAME OF VIRTUAL SYSTEM | CONFIGURATION DEFINITION |
|---|---|
| A | SysA.xml |
| B | SysB.xml |
| ⋮ | ⋮ |
| X | SysX.xml |

FIG. 7

```xml
<?xml version="1.0"?>
<logical_struct xmlns="http://www.foo.bar.com/system">
    <logical_struct_name>system_A</logical_struct_name>
    <!-- VM part -->
    <server_list>
        <server name="web" pool="x86">
            <vm_image>web.img</vm_image>
            <min_instance>1</min_instance>
            <max_instance>5</max_instance>
            <default_instance>1</default_instance>
        </server>
        <server name="lb" pool="x86">
            <vm_image>lb.img</vm_image>
            <min_instance>1</min_instance>
            <max_instance>1</max_instance>
            <default_instance>1</default_instance>
        </server>
        <server name="db" pool="x86">
            <vm_image>db.img</vm_image>
            <min_instance>1</min_instance>
            <max_instance>2</max_instance>
            <default_instance>2</default_instance>
        </server>
    </server_list>
    <!-- network part -->
    <link_list>
        <link src="EXTERNAL-NET" dst="web">
            <outer_ip_address>@@gw-ip@@</outer_ip_address>
            <ip_address>@@web-ip@@:8080</ip_address>
        </link>
        <link src="web" dst="lb">
            <ip_address>@@lb-ip@@</ip_address>
        </link>
        <link src="lb" dst="db">
            <ip_address>@@db-ip@@</ip_address>
        </link>
    </link_list>
</logical_struct>
```

← VIRTUAL MACHINE DESCRIPTION

← NETWORK SETTING DESCRIPTION

FIG. 9

| NAME OF INSTANCE OF VIRTUAL SYSTEM | PHYSICAL SERVER | STATE |
|---|---|---|
| A-ACTIVE | S01, S02 | IN SERVICE |
| A-TEST 01 | S11, S12 | IN TEST |
| ⋮ | ⋮ | ⋮ |
| B-ACTIVE | S35, S44, S76 | IN SERVICE |
| B-TEST 01 | S03, S28, S60 | IN TEST |
| B-TEST 02 | S22, S53, S89 | IN TEST |
| ⋮ | ⋮ | ⋮ |
| X-ACTIVE | S03, S28 | IN DEPLOYMENT |

FIG. 10

| NAME OF SYSTEM | LOGICAL CONFIGURATION CHANGING DEFINITION |
|---|---|
| A | SysA-OperationTest.xml |
| A | SysA-FunctionTest.xml |
| A | SysA-SecurityTest.xml |
| B | SysB-OperationTest.xml |
| B | SysB-FunctionTest.xml |
| B | SysB-SecurityTest.xml |
| ⋮ | ⋮ |
| X | SysX-OperationTest.xml |
| X | SysX-FunctionTest.xml |
| X | SysX-SecurityTest.xml |

FIG. 11

```xml
<?xml version="1.0"?>
<logical_struct xmlns="http://www.foo.bar.com/system">
    <logical_struct_name>system_A-test</logical_struct_name>

<!-- VM part -->
    <!-- additional VMs for test -->
    <server_list>
        <server name="test_client" pool="x86">
            <vm_image>test_client.img</vm_image>
            <min_instance>1</min_instance>
            <max_instance>10</max_instance>
            <default_instance>4</default_instance>
        </server>
        <server name="test_logger" pool="x86">
            <vm_image>test_logger.img</vm_image>
            <min_instance>1</min_instance>
            <max_instance>1</max_instance>
            <default_instance>1</default_instance>
        </server>
        <server name="test_db" pool="x86">
            <vm_image>test_db.img</vm_image>
            <min_instance>1</min_instance>
            <max_instance>2</max_instance>
            <default_instance>2</default_instance>
        </server>
    </server_list>
```
← VIRTUAL MACHINE DESCRIPTION

```xml
    <!-- network part -->
    <!-- network connection settings to be omitted -->
    <link_cut_list>
        <link src="EXTERNAL-NET" dst="web" />
        <link src="lb" dst="db" />
    </link_cut_list>

<!-- network connection settings to be added -->
    <link_add_list>
        <link src="test_client" dst="web">
            <ip_address>@@web-ip@@:8080</ip_address>
        </link>
        <link src="lb" dst="test_logger">
            <ip_address>@@test_logger-ip@@</ip_address>
        </link>
        <link src="lb" dst="test_db">
            <ip_address>@@test_db-ip@@</ip_address>
        </link>
    </link_add_list>
</logical_struct>
```
← NETWORK SETTING DESCRIPTION

FIG. 13

| NAME OF SYSTEM | TEST TYPE | NAME OT TEST ITEM | TEST DETAILS | RESULT |
|---|---|---|---|---|
| A | OPERATION TEST | AT001 | LOG FILE CAN BE OPENED | |
| | | ⋮ | ⋮ | |
| | FUNCTION COVER TEST | FT001 | OUTPUT = 0 IS RETURNED TO INPUT = □ | |
| | | ⋮ | ⋮ | |
| | LOAD TEST WITH CONFIGURATION CHANGE | LT001 | 1 DB/1-10 WEBS | |
| | | LT002 | 5 WEBS/1-3 TEST-DBS | |
| | | ⋮ | ⋮ | |
| B | OPERATION TEST | AT001 | ACCESSIBLE TO DB | |
| | | ⋮ | ⋮ | |
| | FUNCTION COVER TEST | FT001 | OUTPUT = "OK" IS RETURNED TO INPUT = ▲ | |
| | | ⋮ | ⋮ | |
| | LOAD TEST WITH CONFIGURATION CHANGE | LT001 | 2-5 WEBS | |
| | | ⋮ | ⋮ | |
| ⋮ | ⋮ | ⋮ | ⋮ | |
| X | OPERATION TEST | AT001 | ACCESSIBLE TO PROXY SERVER | |
| | | ⋮ | ⋮ | |
| | FUNCTION COVER TEST | FT001 | REQUEST ADDITIONAL SERVER | |
| | | ⋮ | ⋮ | |
| | LOAD TEST WITH CONFIGURATION CHANGE | LT001 | 10-100 TEST-CLIENTS | |
| | | ⋮ | ⋮ | |

SYSTEM EVALUATION APPARATUS

CROSS-REFERENCE TO RELATED APPLICATION

This application is based upon and claims the benefit of priority of the prior Japanese Patent Application No. 2008-282700, filed on Nov. 4, 2008, the entire contents of which are incorporated herein by reference.

FIELD

The present technology relates to a method for evaluating a system including a plurality of servers connected with each other via a network.

BACKGROUND

There have been demands for effectively and efficiently performing tests on a virtualized system (which will be called virtual system hereinafter) in an environment establishing the virtual system by deploying plural virtual machines in a physical server group and linking the deployed plural virtual machines over a network. Today, in general, such a virtual system is developed and is tested in a smaller environment for development/tests than the environment where the virtual system is actually operated, which is physically and specially prepared separately from the real operating environment.

The physical isolation between the real operating environment and the development/test environment can exclude the risk that the system in development/test adversely affects the real active system (such as a malfunction in the system in development causes the termination or a misoperation of the real active system). However, the development/test environment and the real active environment may differ (including a difference in hardware of physical servers and a difference in software such as the version number of the OS (Operating System) or a library). This frequently causes problems that a malfunction, which has not been observed in the development/test environment, is discovered after the system is operated in the real active environment or that a malfunction occurs due to a setting error in porting the system from the development/test environment to the real operating environment.

Notably, various technologies in the past have been available for such a virtual system, which however do not focus on the problems described above. Japanese Laid-open Patent Publication No. 2006-221649, Japanese Laid-open Patent Publication No. 2007-299425, and Japanese Laid-open Patent Publication No. 4-195436 disclose a related technique.

In recent years, uninterruptive operation services are an important system requirement. That is, there are increasing necessity and importance for testing a configuration change in a system (such as a change in the number of linked virtual machines or a change including the application of a security patch) and porting the system after the configuration change to the real operation without interrupting operation services in operation. However, it is difficult to address the request presently.

Furthermore, the tests to be performed may include, for example, a test that checks changes in behavior of a virtual system as a result of a change in number of virtual machines in the virtual system. It is inefficient to set the parameters therefor manually and deploy and establish a virtual system interactively every time the parameter value is changed.

SUMMARY

According to an aspect of the invention, an apparatus for evaluating a change of an existing system to a modified system by using a test system including a subsystem including the same configuration with either of the existing subsystem and the modified system, the test system including a plurality of computers connected with each other via a network, the apparatus includes: a memory for storing configuration information of the test system and test information; and a processor for executing a process including: activating the test system to execute test on the subsystem, collecting test information from the test system, and storing the test result information in the memory while the subsystem has the same configuration as the existing system; confirming the test system has been modified so that the subsystem has the same configuration as the modified system; and activating the test system to execute test on the subsystem, collecting test result information from the test system, and storing the test result information in the memory while the subsystem has the same configuration as the modified system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a system configuration diagram of a virtual system deployment and test control unit according to an embodiment of the present technology.

FIG. 5 is a diagram illustrating an example of a system management table.

FIG. 6 is a diagram illustrating examples of data to be stored in a system logical configuration storage section.

FIG. 7 is a diagram illustrating examples of data to be stored in a logical configuration definition file.

FIG. 9 is a diagram illustrating examples of data to be stored on a system deployment state table.

FIG. 10 is a diagram illustrating examples of data to be stored in a system logical configuration change storage section.

FIG. 11 is a diagram illustrating an example of data to be stored in a logical configuration change definition file.

FIG. 13 is a diagram illustrating examples of data to be stored in a test item storage section.

DESCRIPTION OF EMBODIMENTS

Figure 1:
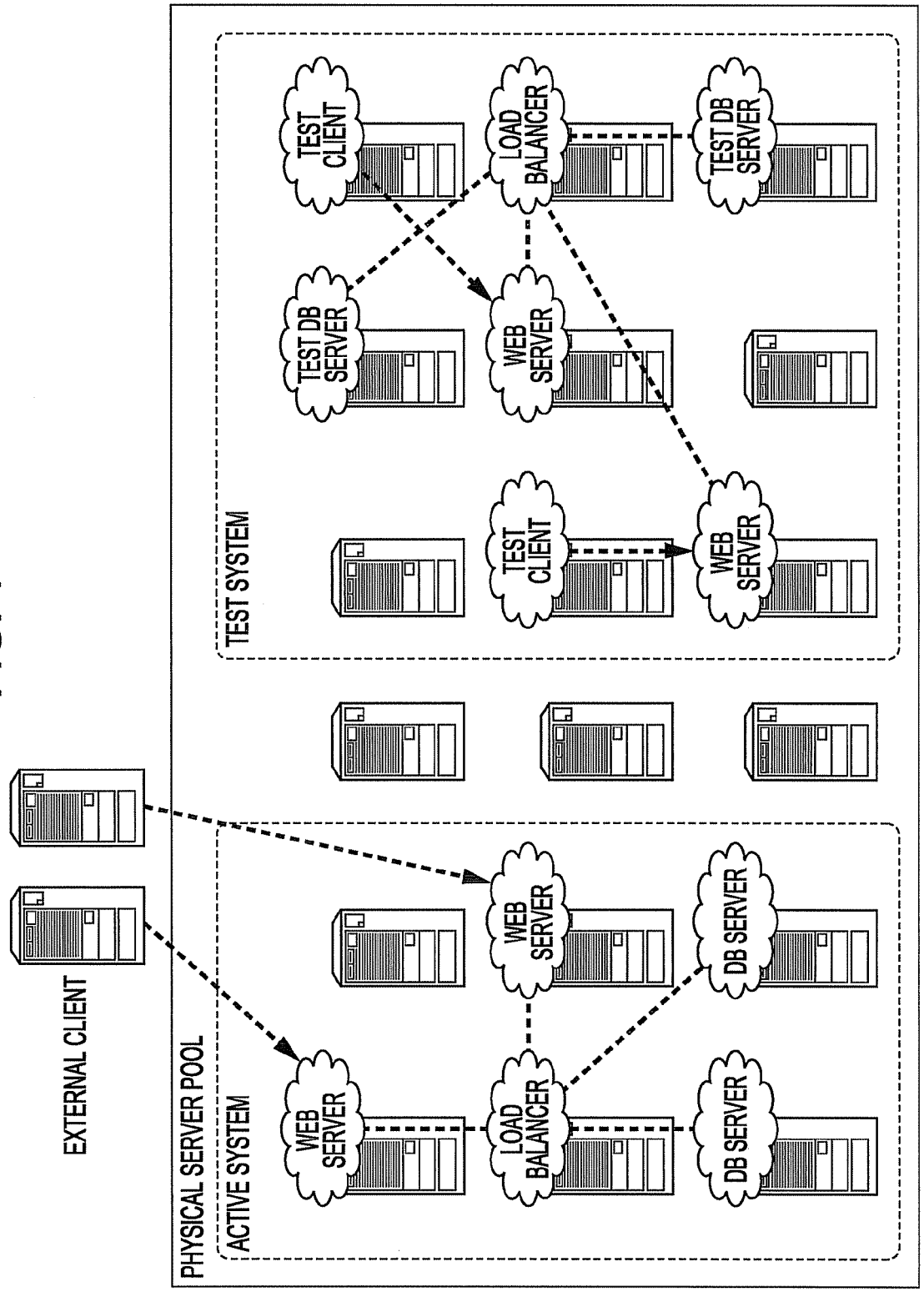
FIG. 1 is a schematic diagram illustrating an assumption in an embodiment of the present technology.

Preferred embodiments of the present invention will be explained with reference to accompanying drawings. According to an embodiment of the present invention, as illustrated in FIG. 1, the coexistence of an active system of a virtual system and a test system of the virtual system is allowed in one physical server pool including plural physical servers. In other words, a test system of the specific virtual system is also started in the physical server pool where the active system may be started, without starting the test system in a different physical server pool, unlike technologies in the past. In the example in FIG. 1, the active system including two Web servers, two DB servers and a load balancer coexists with the test system including two Web servers, two test DB servers, two test clients and a load balancer. Notably, there may be a case that plural virtual machines are started over one physical server.

Figure 2:
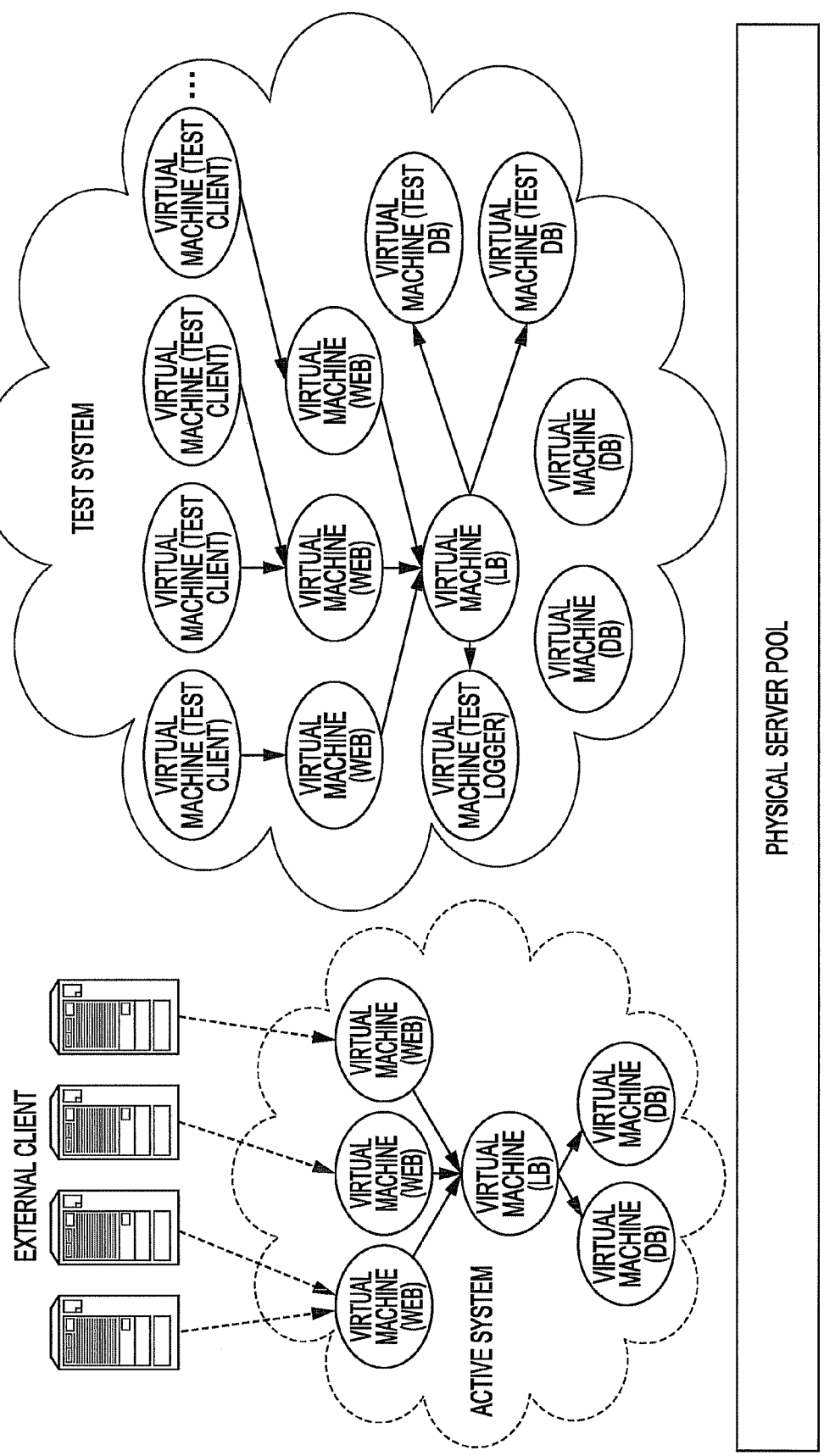
FIG. 2 is a schematic diagram illustrating an assumption in an embodiment of the present technology.

Furthermore, as illustrated in FIG. 2, according to an embodiment of the present technology, the configuration of the test system is devised in addition to the simple coexistence of the active system and test system of a virtual system. That is, the active system of a specific virtual system includes three virtual machines as Web servers, one virtual machine as a load balancer (LB), and two virtual machines as DB servers. Then, the test system of the specific virtual system includes, in addition to the identical virtual machine group to that of the active system, four virtual machines as test clients, one virtual machine as a test logger and two virtual machines as test DBs.

In this case, the two virtual machines as DB servers included in the active system are started but are not used for testing. Instead, two virtual machines as test DBs are used. In this way, the virtual servers in the test system are started in addition to the virtual servers in the active system. However, the network configuration in the test system, which is indicated by the illustrated arrows, is a network configuration for testing, which is different from that in the active system.

In this way, the implementation of the virtual machine configuration in the test system by addition of virtual machines to the virtual machine configuration in the active system can prevent problems which may occur in migration from the test system to the active system. In other words, only differences from the active system (existing system) are defined for the test system, without defining the active system and the test system separately. An existing system and a test system corresponding to the existing system include a same subsystem, respectively. Thus, when the test system is defined and is established, the virtual machine configuration of the active system has already been fixed. Therefore, if there are no problems found as a result of tests on the test system, the active system can be immediately deployed and be operated. In addition, the system migration performed in the same physical server pool may prevent problems due to differences in configuration of the physical servers included in the physical server pool. In other words, the test system can be switched smoothly to the active system.

Assuming the outline as described above, FIG. 3 illustrates a system outline according to this embodiment. A service operation manager terminal 1 connects to a virtual system deployment and test control apparatus 3 over a network. Furthermore, the virtual system deployment and test control apparatus 3 connects to a physical server pool 5 including plural physical servers over a network.

FIG. 4 illustrates details of the virtual system deployment and test control apparatus 3 that performs main processing according to this embodiment. The virtual system deployment and test control apparatus 3 includes an I/F 31 that functions as an interface with the service operation manager terminal 1, a system managing section 32, a system management table 33, a system logical configuration storage section 34, a VM (virtual machine) image repository 35, a logical system deploying section 37, a system deployment state table 38, a system logical configuration change storage section 36, a test driver VM image repository 39, an automatic test executing section 41, a test item storage section 40, and a physical resource managing section 42. Notably, the system logical configuration storage section 34 and VM image repository 35 store active system information. The system logical configuration change storage section 36, test driver VM image repository 39 and test item storage section 40 store test system information.

The I/F 31 outputs data received from the service operation manager terminal 1 to the system managing section 32 and outputs data received from the system managing section 32 to the service operation manager terminal 1. The system managing section 32 stores or deletes data to or from the system logical configuration storage section 34, VM image repository 35, system logical configuration change storage section 36, test driver VM image repository 39 and test item storage section 40 in accordance with an instruction from the service operation manager terminal 1. The system managing section 32 further uses the system management table 33 to manage the data stored in the data storage sections described above. The system managing section 32 is further in cooperation with the logical system deploying section 37 and automatic test executing section 41.

The logical system deploying section 37 manages the system deployment state table 38 and uses data stored in the system logical configuration storage section 34, VM image repository 35, system logical configuration change storage section 36, and test driver VM image repository 39 to deploy a logical system 51 over physical machines reserved in the physical server pool 5 and performs processing including removal of a virtual machine. The logical system deploying section 37 is in cooperation with the physical resource managing section 42 and the automatic test executing section 41.

The physical resource managing section 42 performs processing including reserving or releasing a physical server in the physical server pool 5 in accordance with an instruction from the logical system deploying section 37. Notably, the details of the processing by the physical resource managing section 42 are similar to those in the past.

In accordance with an instruction from the logical system deploying section 37, the automatic test executing section 41 executes a test item stored in the test item storage section 40 on the logical system 51 and outputs the test result to the logical system deploying section 37. In order to perform a test on plural virtual machine configurations as will be described later, the automatic test executing section 41 autonomously identifies variations of the virtual machine configurations to be tested and causes the logical system deploying section 37 to deploy the corresponding virtual machine configurations and tests them.

FIG. 5 illustrates examples of data stored in the system management table 33. For each virtual system, the system management table 33 stores a file name of a logical configuration definition file and a file name of a VM image file, which are used as configuration information on the active system and a file name of a logical configuration change definition file and a file name of a test driver VM image file, which are used as configuration change information on the test system. Notably, a file name of a test item file to be used for a test on the test system is also stored for each virtual system.

FIG. 6 illustrates examples of data stored in the system logical configuration storage section 34. For each virtual system, the system logical configuration storage section 34 stores a configuration definition file for the active system. The configuration definition file may include data as illustrated in FIG. 7, for example. The configuration definition file illustrated in FIG. 7 is described in XML and includes a virtual machine description and a network setting description. The virtual machine description includes a server list and stores, for each server, a name of the server (such as web, lb and db), a VM image file name (such as web.img, lb.img, and db.img), the minimum number of instances, the maximum number of instance, and a default number of instances. In this example, the attribute pool="x86" indicates the processor type of the physical server to be reserved. The network setting description includes a link list and stores, for each link, a source node name (such as EXTERNAL-NET and Web), destination node name (such as lb and db) and an IP address. Notably, when the source node name indicates an external network, the IP address of the gateway which is a connection point with the external network is also stored therein.

Figure 8:
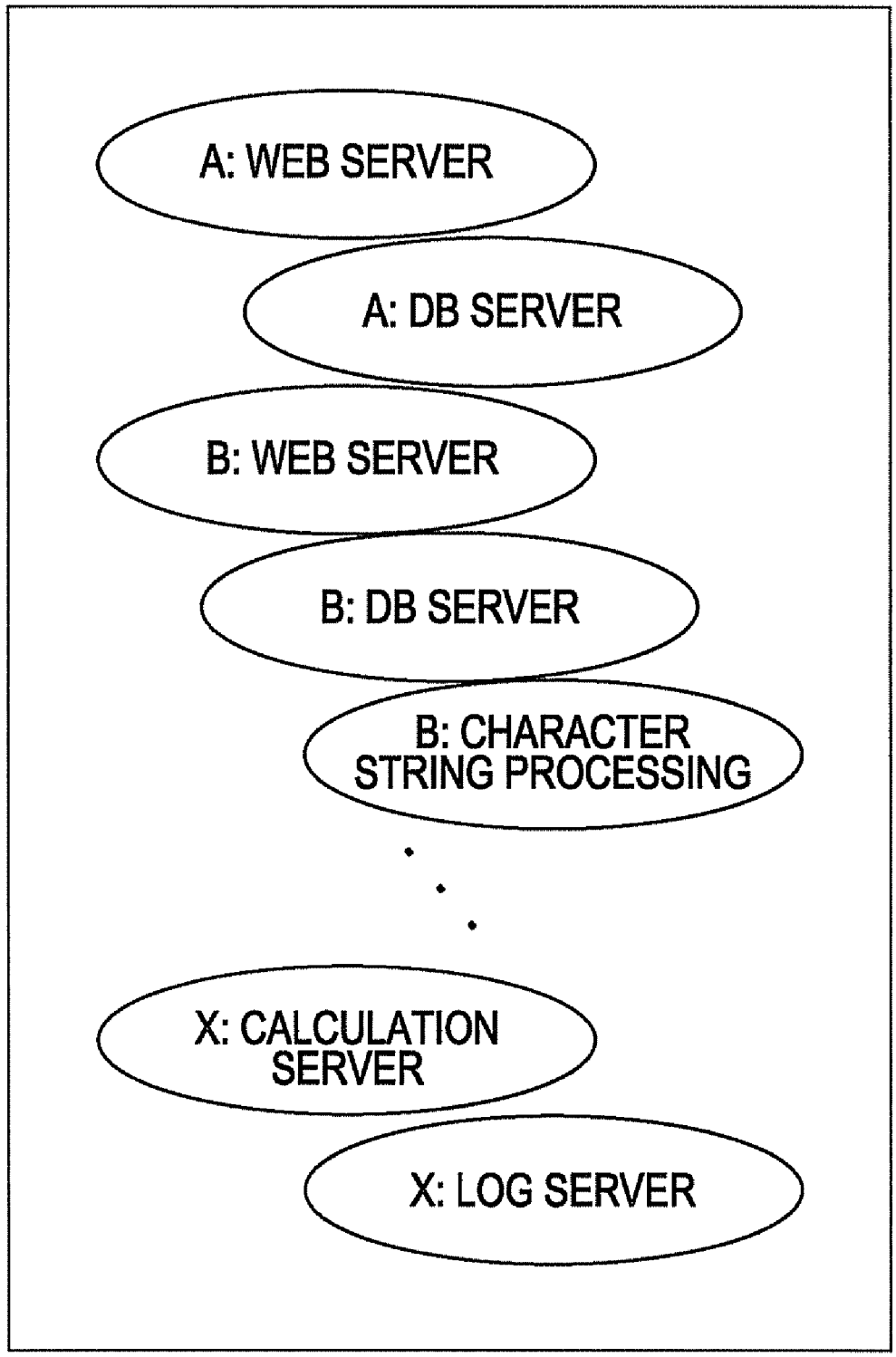
FIG. 8 is a diagram schematically illustrating data to be stored in a VM image repository.

FIG. 8 illustrates a schematic diagram of data to be stored in the VM image repository 35. The VM image repository 35 stores an image file having an image file name stored in a column of the VM image file name on the system management table 33. The VM image repository 35 further stores all image files for virtual machines listed in the configuration definition file. In the example in FIG. 8, the expression "A: Web server" indicates an image file for a Web server in a virtual system A.

FIG. 9 illustrates examples of data stored in the system deployment state table 38 managed by the logical system deploying section 37. In the examples in FIG. 9, an instance name (virtual system type+instance name (active/test+number)) of a virtual system, an identifier of a reserved physical server and a state (such as "in service", "in test", and "in deployment"), which are managed by the logical system deploying section 37, are stored therein.

Next, FIG. 10 illustrates examples of data stored in the system logical configuration change storage section 36. The system logical configuration change storage section 36 stores, for each virtual system, a configuration change definition file for the test system. The configuration change definition file may include data as illustrated in FIG. 11. The configuration change definition file includes a virtual machine description having a list of virtual machines to be deployed and be started in addition to the virtual machines listed in the virtual machine description in the configuration definition file and a network setting description including a link to be deleted and a link to be added of the links listed in the network setting description in the configuration definition file. Also in the configuration change definition file, the virtual machine description is described in the same manner as that for the configuration definition file. On the other hand, the network setting description is different in that it includes a cut list for a link to be deleted and an add list for a link to be added as described above. While only the link type is designated in the cut list, the add list is described in the same manner as that for the network setting description in the configuration definition file.

Figure 12:
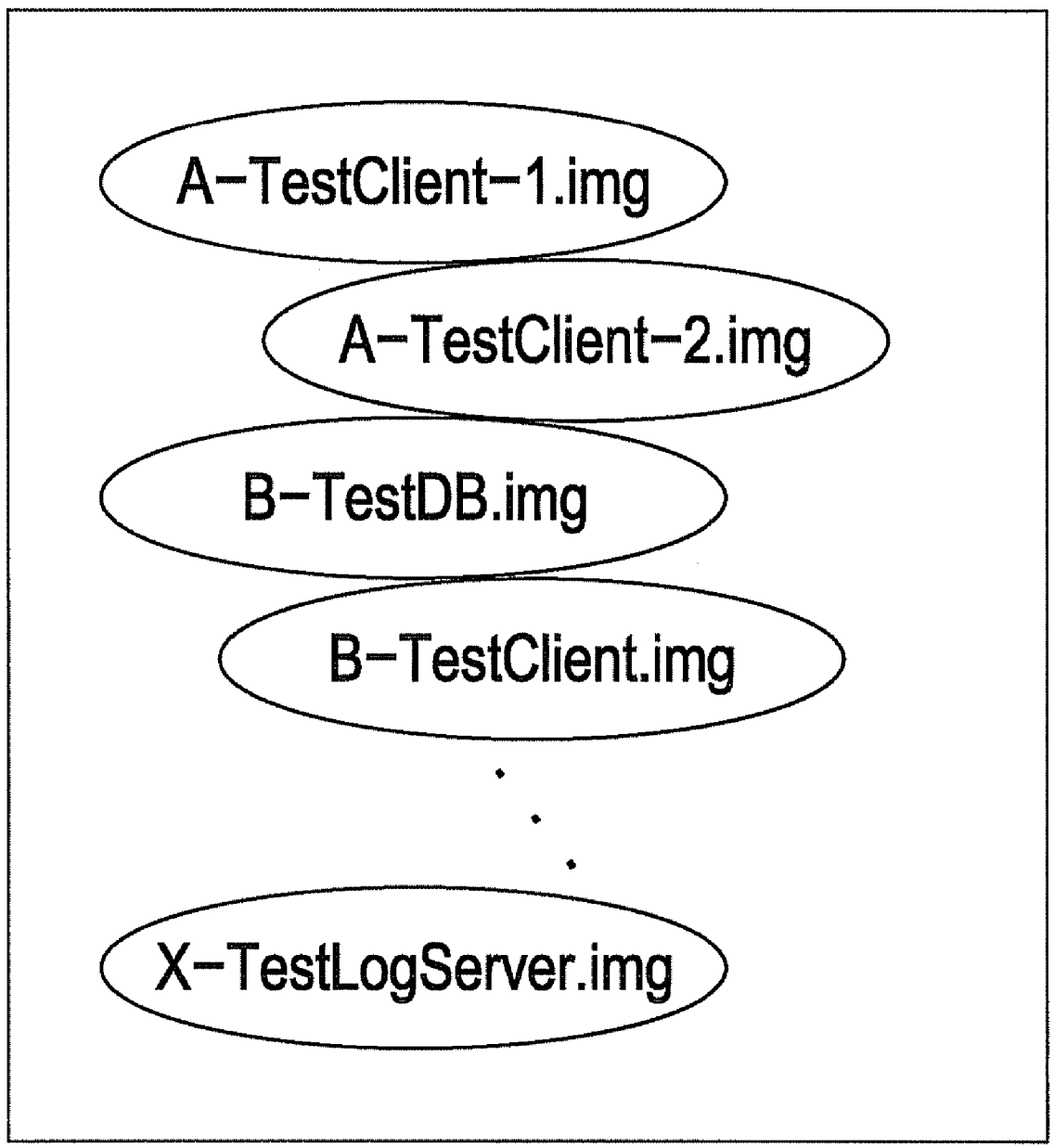
FIG. 12 is a diagram schematically illustrating data to be stored in a test driver VM image repository.
Figure 14:
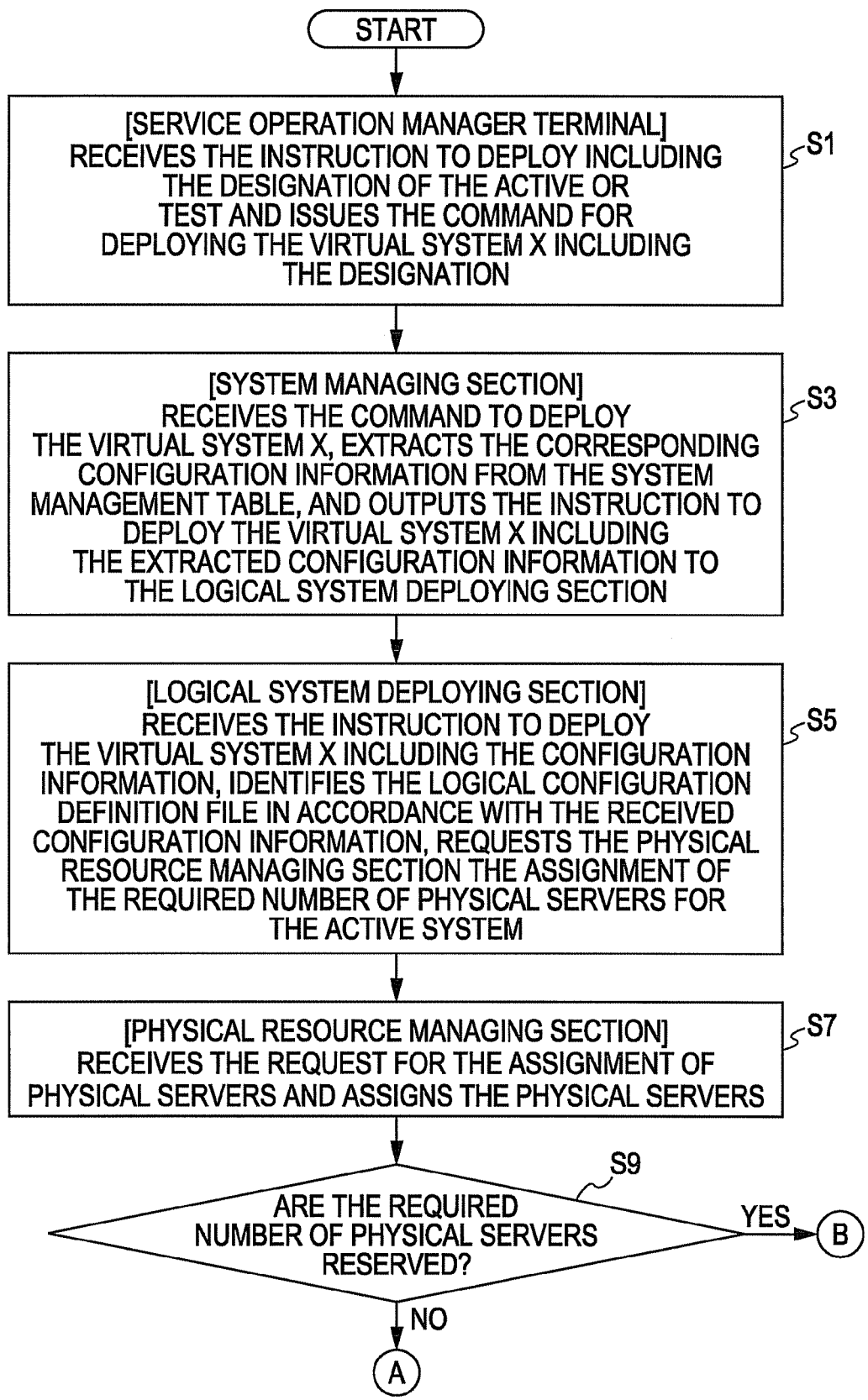
FIG. 14 is a diagram illustrating a processing flow assumed according to an embodiment.

FIG. 12 illustrates a schematic diagram of data to be stored in the test driver VM image repository 39. The test driver VM image repository 39 stores an image file having an image file name stored in a column of the test driver VM image file name on the system management table 33. The test driver VM image repository 39 further stores all image files for virtual machines listed in the configuration change definition file.

The test item storage section 40 stores data as illustrated in FIG. 13. In the example in FIG. 13, a test item name and test details are stored for each virtual system. According to this embodiment, a load test with a configuration change is defined. For example, for a virtual system A, under the test item LT001, one DB server is fixed for the test system, while the number of Web servers for the test system is changed from one to ten. Under the test item LT002, five Web servers are fixed for the test system, while the number of DB servers (or test-DBs) for the test system is changed from one to three. For a virtual system B, under the test item LT001, the number of the Web servers for the test system is changed from two to five. For a virtual system X, under the test item LT001, the number of test client terminals (or test-Clients) is changed from 10 to 100. Notably, the number of virtual machines described in the test item file is defined within the range between the minimum number and the maximum number in the virtual machine description in FIG. 7 and FIG. 11.

FIG. 13 illustrates test data for all virtual systems in a table form, but it is assumed here that the test data is stored as a test item file for each virtual system. The success or failure of a test is stored when the test is executed. However, because the test result itself is transmitted from the automatic test executing section 41 through the logical system deploying section 37, system managing section 32 and I/F 31 to the service operation manager terminal 1, the test result is not held in the test item storage section 40.

Figure 3:
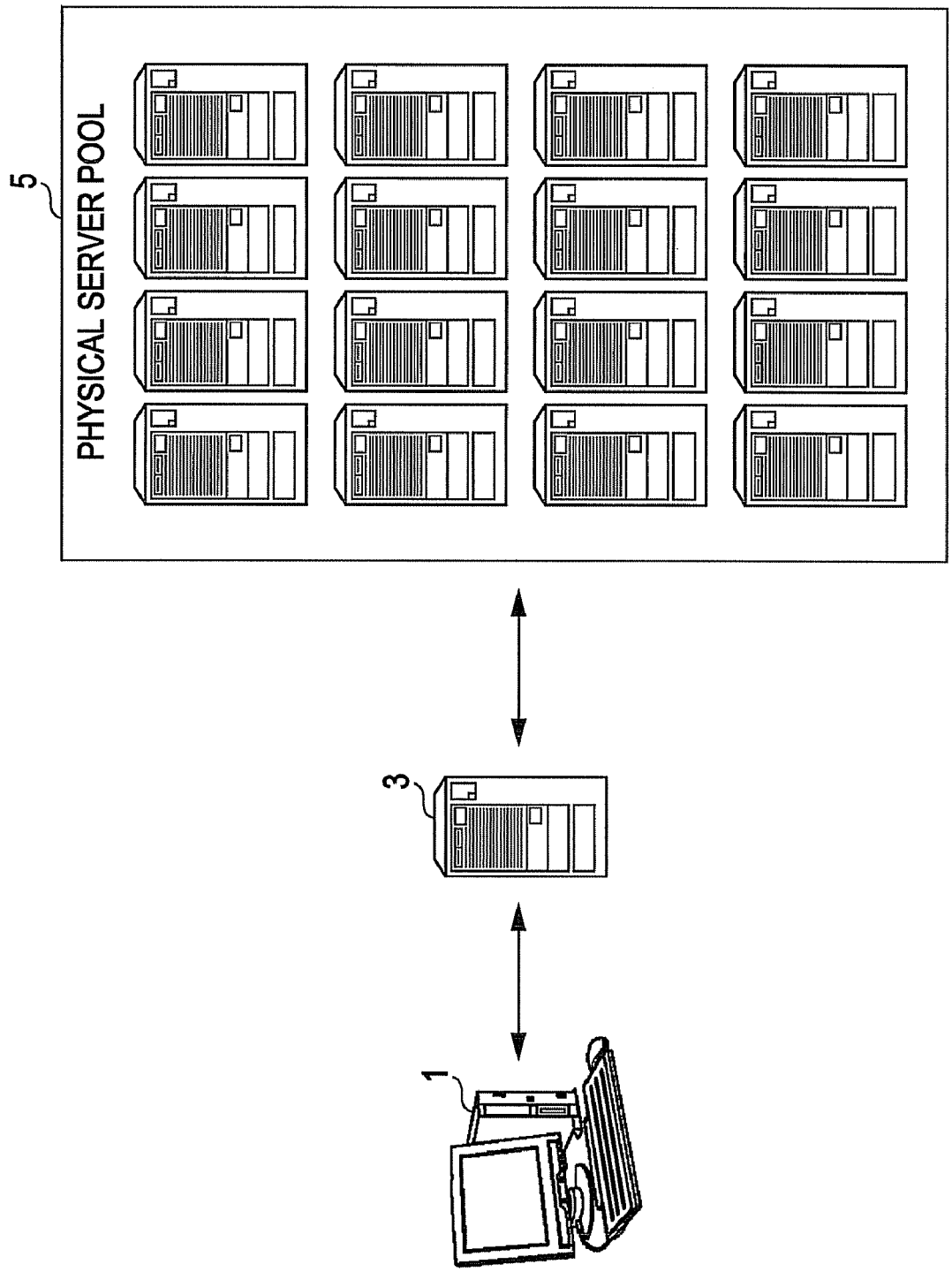
FIG. 3 is a system schematic diagram according to an embodiment of the present technology.

Next, with reference to FIG. 14 to FIG. 22, basic operations by the system illustrated in FIG. 3 will be described. First of all, the service operation manager inputs an instruction to deploy a specific virtual system X including the designation of the active or test to the service operation manager terminal 1. The service operation manager terminal 1 receives the instruction to deploy the specific virtual system X including the designation of the active or test and issues the command to deploy the virtual system X including the designation of the active or test to the virtual system deployment and test control apparatus 3 (step Si). The I/F 31 in the virtual system deployment and test control apparatus 3 receives the command to deploy the virtual system X including the designation of the active or test from the service operation manager terminal 1 and outputs it to the system managing section 32. The system managing section 32 receives the command to deploy the virtual system X including the designation as described above, extracts the configuration information corresponding to the deployment command from the system management table 33 and outputs the instruction to deploy the virtual system X including the extracted configuration information to the logical system deploying section 37 (step S3). In order to deploy an active system of the virtual system X, the file name of the logical configuration definition file and the file name of the VM image file for the virtual system X are extracted from the system management table 33 and are output to the logical system deploying section 37 as configuration information. On the other hand, in order to deploy a test system of the virtual system X, the file name of the logical configuration definition file and the file name of the VM image file, the file name of the logical configuration change definition file and the file name of the test driver VM image file for the virtual system X are extracted from the system management table 33 and are output to the logical system deploying section 37 as configuration information.

The logical system deploying section 37 receives the instruction to deploy the virtual system X including the configuration information from the system managing section 32, identifies the logical configuration definition file in the system logical configuration storage section 34 in accordance with the received configuration information, requests the physical resource managing section 42 the assignment of the required number of physical servers the active system in accordance with the virtual machine description in the logical configuration definition file (step S5). Because the example in FIG. 7 includes one Web server by default, one load balancer lb by default and two DB servers by default, the assignment of a total of four is requested. Notably, the logical system deploying section 37 adds a record relating to the received deployment instruction on the system deployment state table 38. For example, regarding the deployment of the test system of the virtual system X, records "X-Test 01" as the instance name of the virtual system, "undecided" for physical servers, and "in deployment" as the state are added.

The physical resource managing section 42 receives the request for the assignment of physical servers from the logical system deploying section 37 and assigns the physical servers in the physical server pool 5 in accordance with the request (step S7). Because the processing itself is similar to that in the past, further descriptions thereon will be omitted herein. Notably, if the required number of physical servers are reserved, which physical servers are reserved is notified to the logical system deploying section 37. The logical system deploying section 37 stores the names of the reserved physical servers in the corresponding records on the system deployment state table 38.

Here, if the required number of physical servers are not reserved (step S9: No), the processing moves to the processing in FIG. 15 through the terminal A. On the other hand, if the required number of physical servers are reserved (step S9: Yes), the processing moves to the processing in FIG. 16 through the terminal B.

Figure 15:
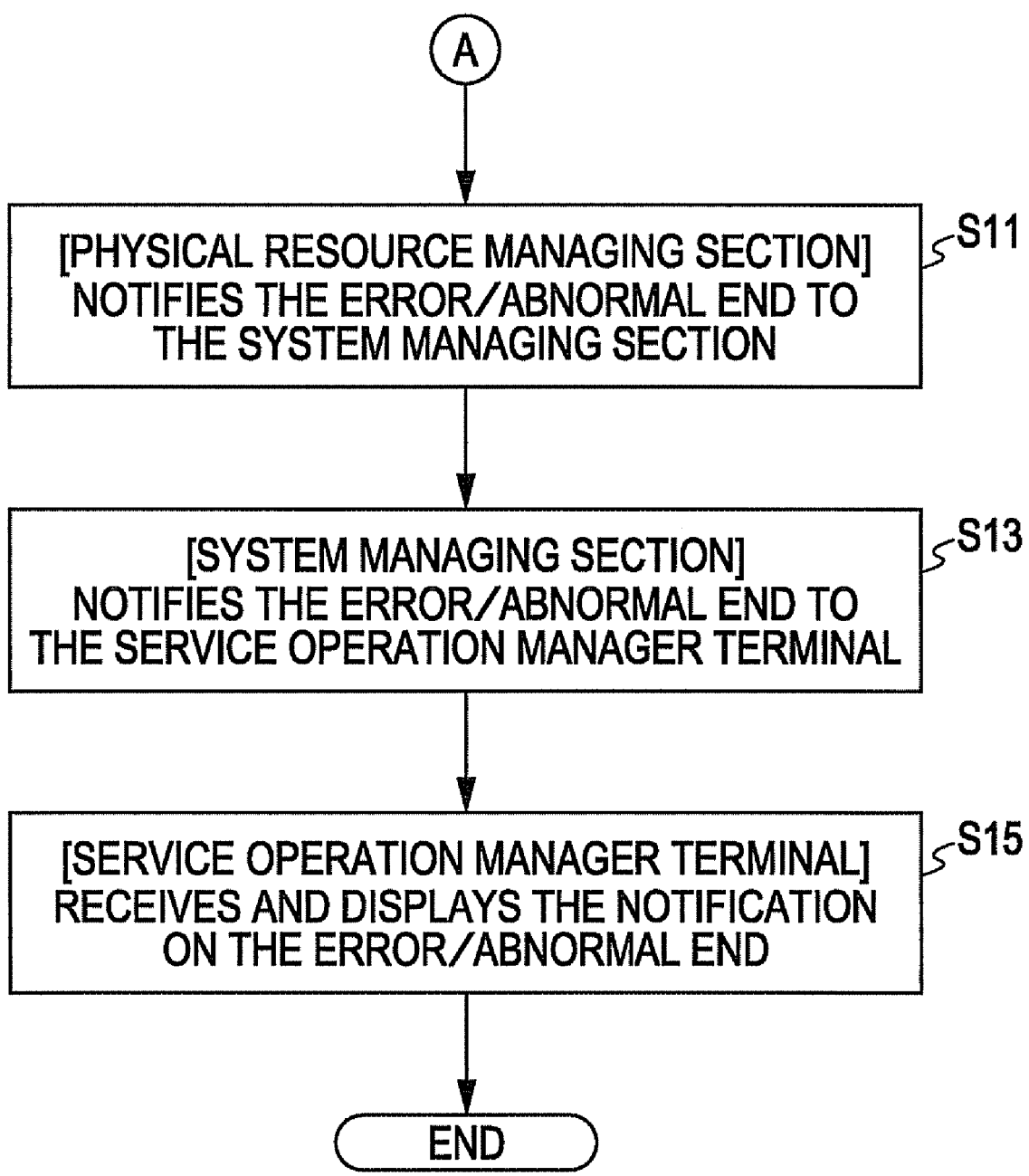
FIG. 15 is a diagram illustrating a processing flow assumed according to the embodiment.
Figure 16:
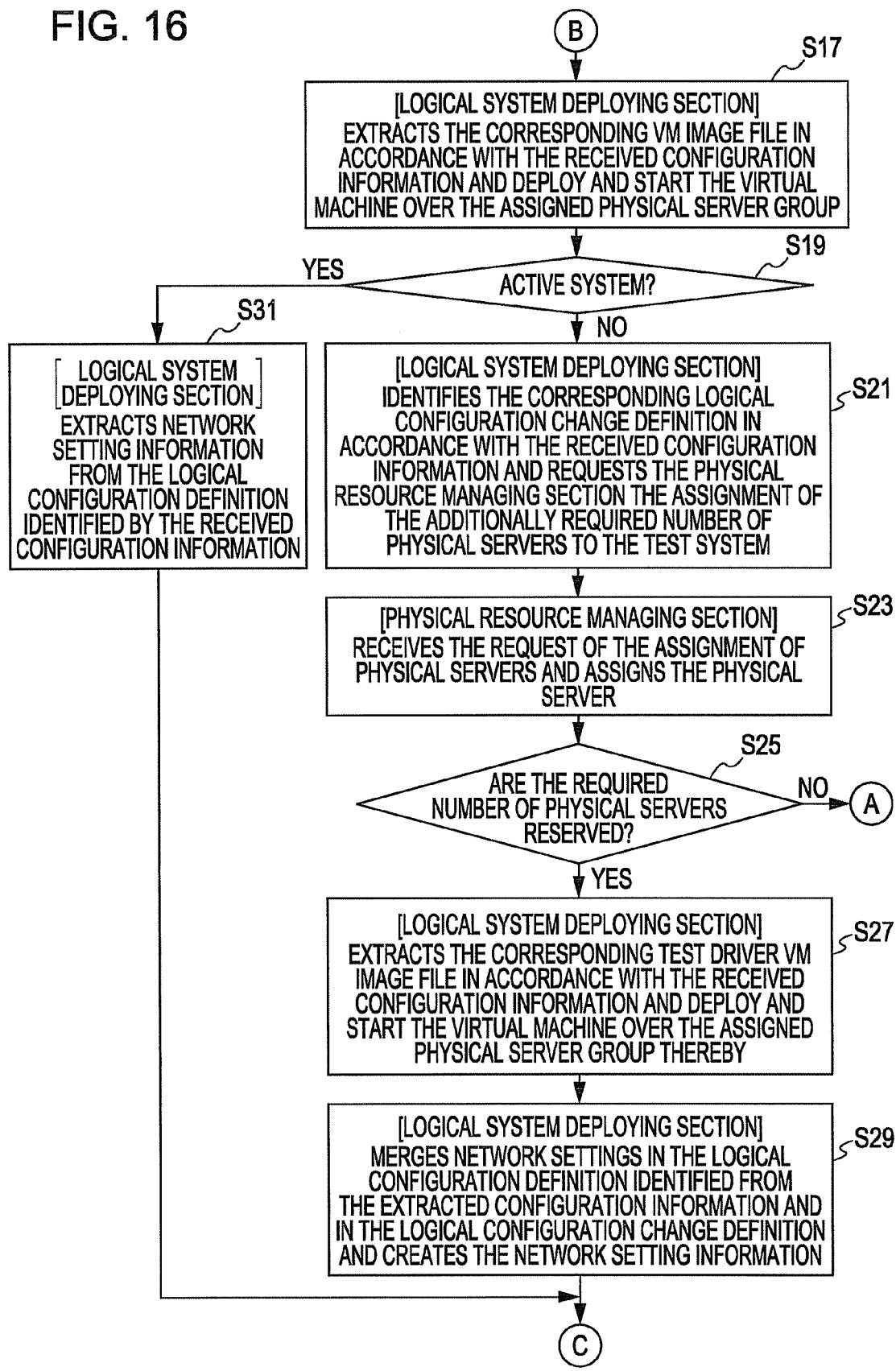
FIG. 16 is a diagram illustrating a processing flow assumed according to the embodiment.

If the required number of physical servers are not reserved, the physical resource managing section 42 notifies the error/abnormal end to the system managing section 32 through the logical system deploying section 37 (FIG. 15/step S11). Notably, the already reserved physical servers are released. If the logical system deploying section 37 receives the error/abnormal end, the logical system deploying section 37 transfers it to the system managing section 32 and deletes the corresponding record on the system deployment state table 38. The system managing section 32 notifies the error/abnormal end to the service operation manager terminal 1 through the I/F 31 (step S13). If the service operation manager terminal 1 receives the notification of the error/abnormal end from the virtual system deployment and test control apparatus 3, the service operation manager terminal 1 may display it on the display device to notify it to the service operation manager (step S15). Then, the processing ends.

On the other hand, if the required number of physical servers are reserved, the logical system deploying section 37 extracts the corresponding VM image file from the VM image repository 35 in accordance with the file name of the VM image file included in the received configuration information and loads the VM image onto the assigned physical server group to deploy and start the virtual machine thereby (step S17). Then, if the active system is deployed, the start of the required virtual machines completes. On the other hand, if the test system is deployed, the start of partial virtual machines completes.

The logical system deploying section 37 detects that either of the active system or the test system is designated. In order to deploy the active system (step S19: Yes), the logical system deploying section 37 extracts the network setting information (which is the network setting description itself here) from the logical configuration definition file identified by the received configuration information (step S31). After that, the processing moves to the processing in FIG. 17 through the terminal C.

On the other hand, in order to deploy a test system (step S19: No), the logical system deploying section 37 identifies the corresponding logical configuration change definition file in the system logical configuration change storage section 36 in accordance with the received configuration information and requests the physical resource managing section 42 the assignment of the physical servers the number of which is defined in the virtual machine description in the logical configuration change definition file and is additionally used for the test system (step S21).

If the physical resource managing section 42 receives the request of the assignment of additional physical servers from logical system deploying section 37, the physical resource managing section 42 assigns the physical server in the physical server pool 5 in accordance with the request (step S23). Because the processing is also similar to those in the past, further description thereon will be omitted herein. If the required number of physical servers are reserved, which physical servers are reserved is notified to the logical system deploying section 37. The logical system deploying section 37 stores the names of the reserved physical servers to the corresponding records on the system deployment state table 38.

Here, if the required number of physical servers are not reserved (step S25: No), it is difficult to establish the test system. Therefore, the processing moves to the processing in FIG. 15 through the terminal A. On the other hand, if the required number of physical servers are reserved (step S25: Yes), the logical system deploying section 37 extracts the corresponding test driver VM image file from the test driver VM image repository 39 in accordance with the file name of the test driver VM image file included in the received configuration information and loads the test driver VM image to the assigned physical server group to deploy and start the virtual machine thereby (step S27).

In this way, in order to deploy the test system, the virtual machines for the active system are deployed and are started first, and the virtual machines additionally required for the test system are then deployed and are started. This means that when the test system is ready to deploy, the active system has already been ready to deploy. Therefore, if no problems occur in the test system, the migration to the active system can be immediately implemented.

The logical system deploying section 37 further merges the network setting description in the logical configuration definition file identified from the received configuration information and the network setting description in the logical configuration change definition file, creates the network setting information for the test system and stores it in a storage device such as a main memory (step S29). In the example in FIG. 7, the link (1a) between an external network and a Web server, the link (2a) between a Web server and the load balancer lb and the link (3a) between the load balancer lb and a DB server are defined. In the example in FIG. 11, the defined cut list includes the link (1b) between an external network and a Web server and the link (2b) between the load balancer lb and a DB server, and the defined add list includes the link (1c) between the test client and the Web server, the link (2c) between the load balancer lb and the test logger, the link (3c) between the load balancer lb and the test DB server. Therefore, (1a) is deleted by (1b), and (3a) is deleted by (2b). In other words, the remaining links are (2a), (1c), (2c) and (3c). These are links to be included in the network setting information. The processing moves to the processing in FIG. 17 through the terminal C.

It may be difficult to establish the network configuration of the test system simply by adding links to that of the active system. In order to fill the difference, the merging processing as described above is performed. However, it is difficult to establish the proper test system if both of the network setting description in the logical configuration file and the network setting description in the logical configuration change definition file are defined to be matched. In other words, if the network setting description in the logical configuration file or the network setting description in the logical configuration change definition file has any improper part, it is difficult to test the test system. Therefore, if the test system can be tested properly, there is a greatly higher probability that the active system can also operate without problems.

Figure 17:
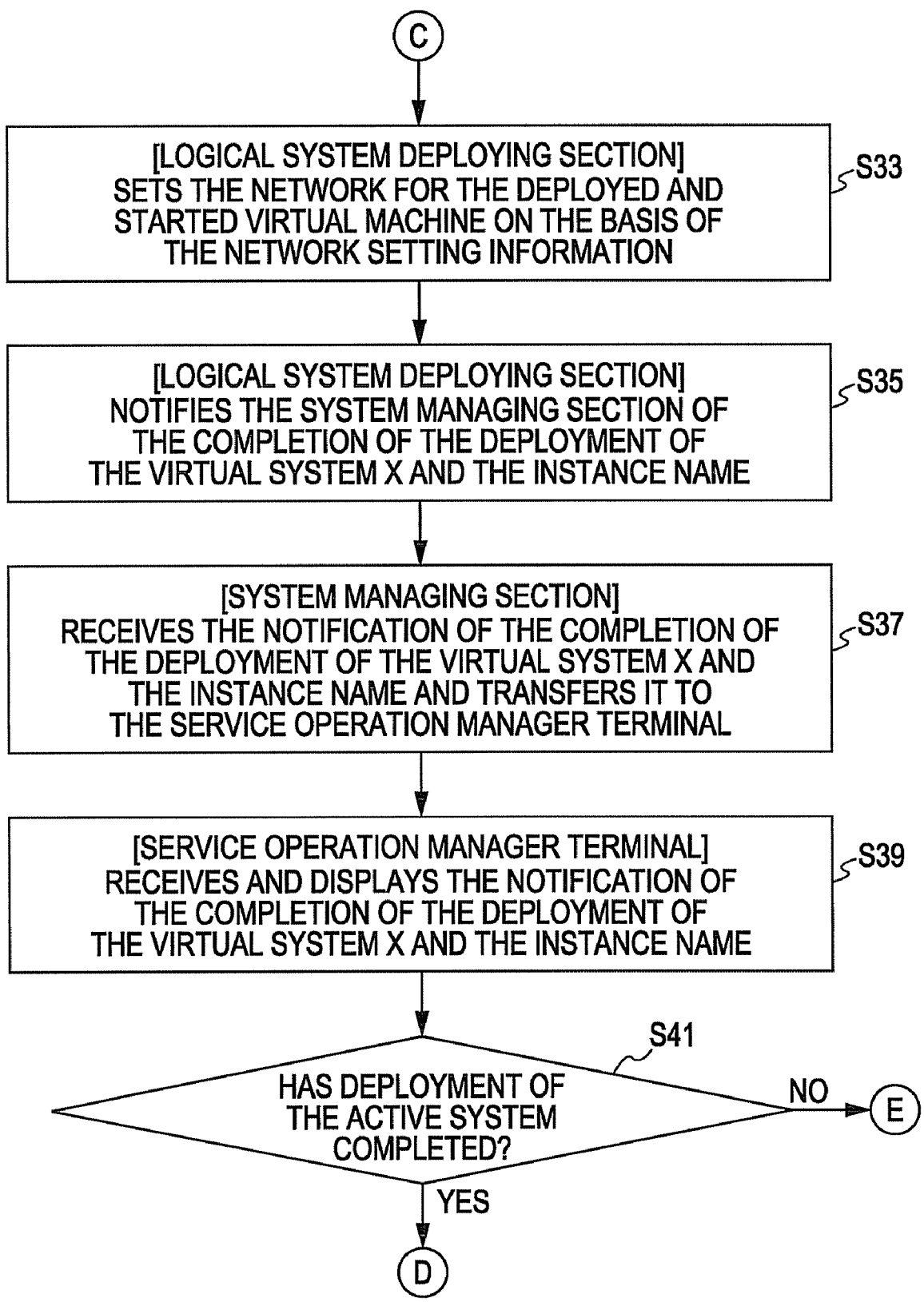
FIG. 17 is a diagram illustrating a processing flow assumed according to the embodiment.

Moving on to the description on the processing on FIG. 17, the logical system deploying section 37 sets the network for the deployed and started virtual machine on the basis of the network setting information created in step S31 or S29 (step S33). Thus, the intended logical system 51 has been established on the physical server pool 5. Therefore, the states on the corresponding records may be changed to "deployment-completed", for example, on system deployment state table 38. Notably, because the processing itself is similar to that in the past, further descriptions thereon will be omitted herein.

The logical system deploying section 37 notifies the system managing section 32 of the completion of the deployment of the virtual system X and the instance name (step S35). The system managing section 32 receives the notification of the completion of the deployment of the virtual system X and the instance name from the logical system deploying section 37 and transfer it to the service operation manager terminal 1 through the I/F 31 (step S37). The service operation manager terminal 1 receives the notification of the completion of the deployment of the virtual system X and the instance name from the virtual system deployment and test control apparatus 3 and displays them on the display device (step S39). Thus, the service operation manager can recognize that the preparation has completed.

Figure 20:
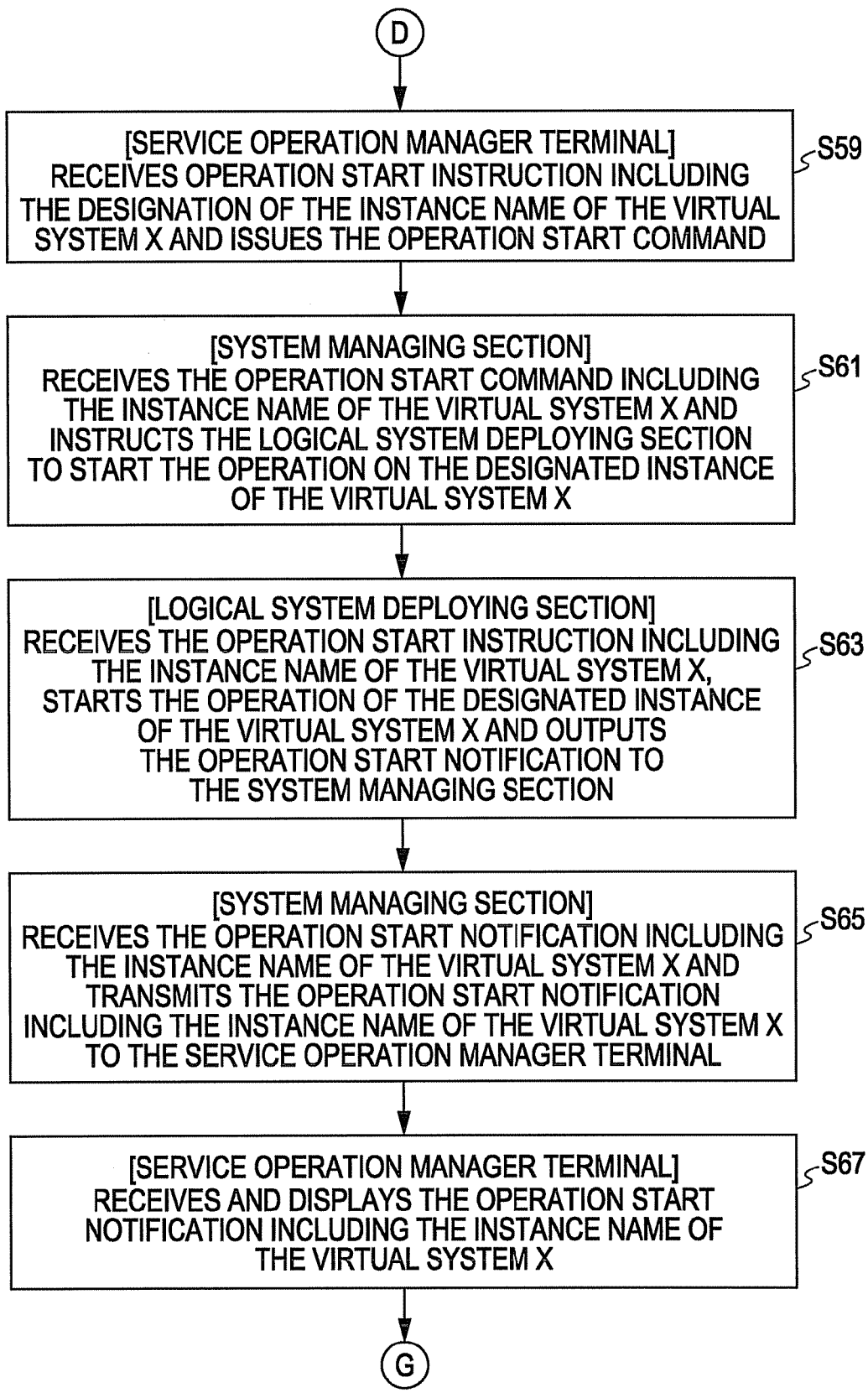
FIG. 20 is a diagram illustrating a processing flow assumed according to the embodiment.

Here, if the deployment of the active system completes (step S41:Yes), processing moves to the processing in FIG. 20 through the terminal D. On the other hand, if the deployment of the test system completes (step S41: No), the processing moves to the processing in FIG. 18 through the terminal E.

Figure 18:
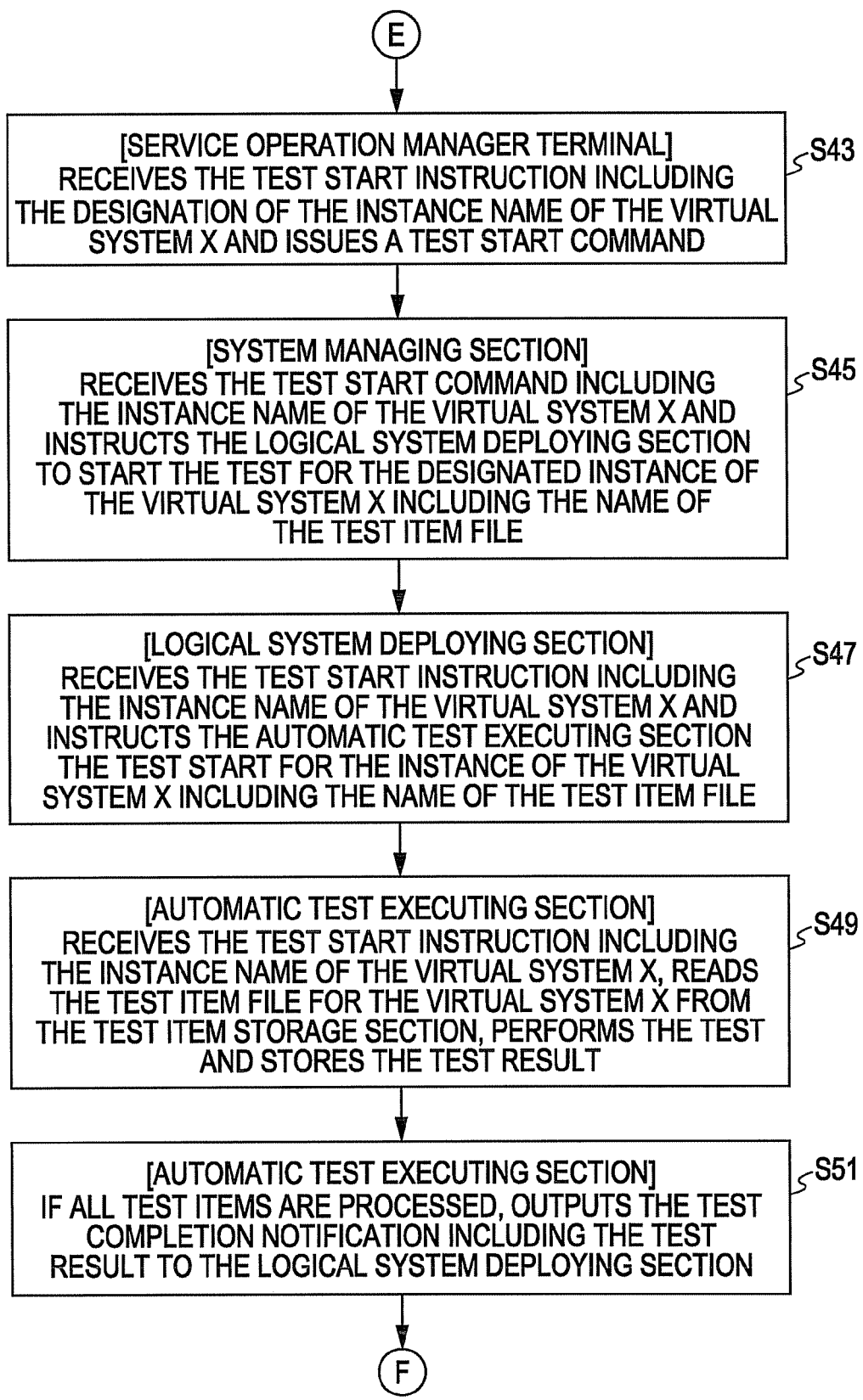
FIG. 18 is a diagram illustrating a processing flow assumed according to the embodiment.
Figure 19:
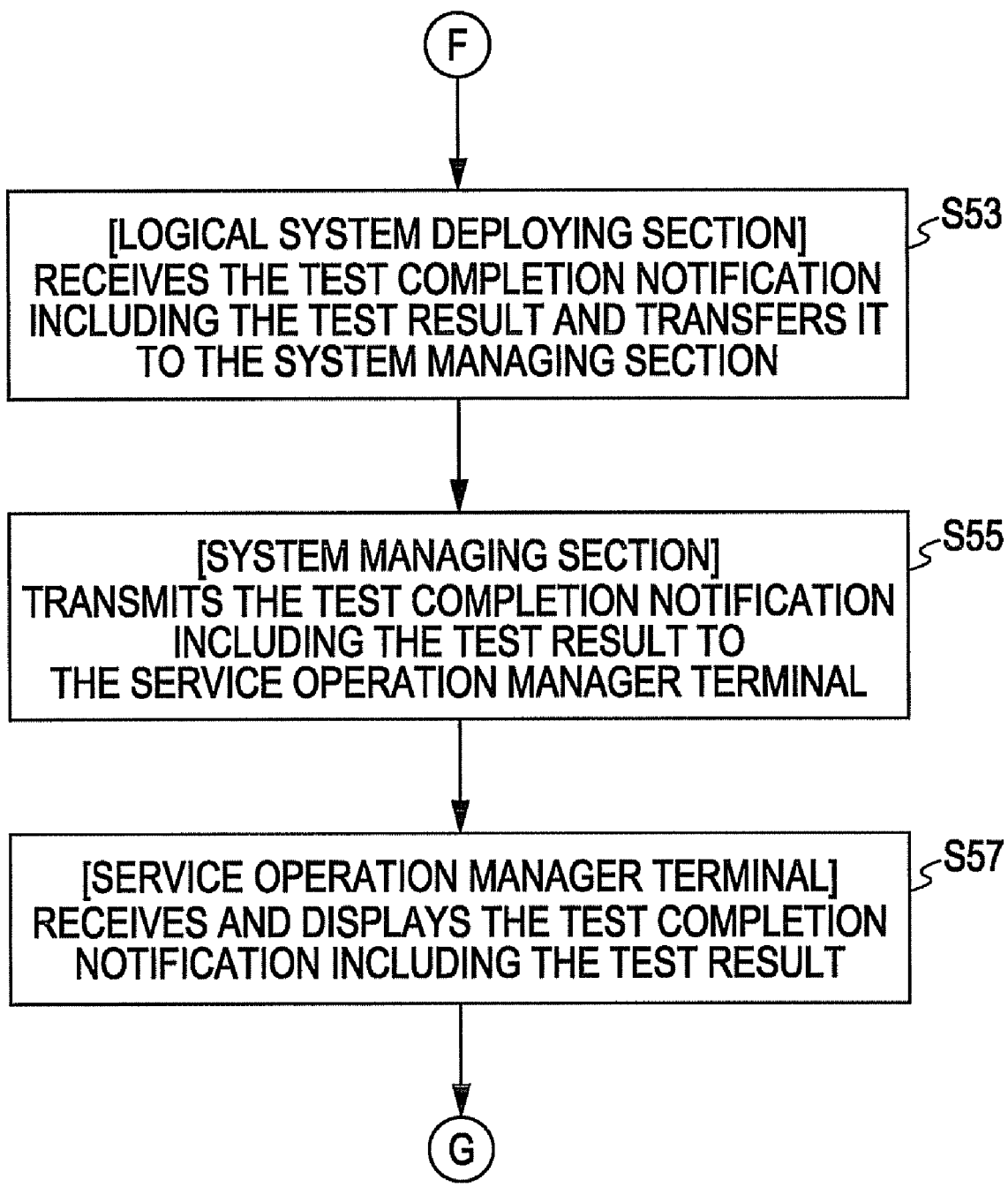
FIG. 19 is a diagram illustrating a processing flow assumed according to the embodiment.

If the deployment of the test system completes, the processing moves to the processing in FIG. 18, and the service operation manager inputs a test start instruction including the designation of the instance name of the virtual system X to the service operation manager terminal 1. The service operation manager terminal 1 receives the test start instruction and issues a test start command to the virtual system deployment and test control apparatus 3 (step S43).

The system managing section 32 in the virtual system deployment and test control apparatus 3 receives the test start command including the instance name of the virtual system X through the I/F 31, identifies the file name of the test item file regarding the virtual system X from the system management table 33 and instructs the logical system deploying section 37 to start the test for the designated instance of the virtual system X including the file name of the test item file (step S45).

The logical system deploying section 37 receives the test start instruction including the file name of the test item file and including the instance name of the virtual system X from the system managing section 32 and instructs the automatic test executing section 41 the test start for the instance of the virtual system X including the file name of the test item file (step S47). The automatic test executing section receives the test start instruction including the file name of the test item file and the instance name of the virtual system X from the logical system deploying section 37, reads the test item file under the designated file name from the test item storage section 40, performs the test in accordance with the test item file and stores the test result to a storage device such as the main memory (step S49). Because the testing itself in accordance with the corresponding test item file is similar to those in the past, further descriptions thereon will be omitted herein. Notably, the state on the corresponding record may be changed to "in test", for example, on system deployment state table 38.

If all of the test items are processed, the automatic test executing section 41 notifies the test completion notification including the test result to the logical system deploying section 37 (step S51). The processing moves to the processing in FIG. 19 through the terminal F.

The logical system deploying section 37 receives the test completion notification including the test result from the automatic test executing section 41 and transfers it to the system managing section 32 (step S53). The system managing section 32 receives the test completion notification including the test result from the logical system deploying section 37 and transmits the test completion notification including the test result to the service operation manager terminal 1 through the I/F 31 (step S55). The service operation manager terminal 1 receives the test completion notification including the test result from the virtual system deployment and test control apparatus 3 and displays it on the display device (step S57). Thus, the service operation manager can determine the test result and deal with problems if any. The processing moves to the processing in FIG. 21 through the terminal G.

Next, the processing to be performed if the active system is deployed will be described with reference to FIG. 20. A service operation manager inputs the operation start instruction including the designation of the instance name of the virtual system X to the service operation manager terminal 1. The service operation manager terminal 1 receives the operation start instruction including the designation of the instance name of the virtual system X and issues the operation start command including the instance name of the virtual system X to the virtual system deployment and test control apparatus 3 (step S59). The system managing section 32 in the virtual system deployment and test control apparatus 3 receives the operation start command including the instance name of the virtual system X from the service operation manager terminal 1 through the I/F 31 and instructs the logical system deploying section 37 to start the operation on the designated instance of the virtual system X (step S61).

The logical system deploying section 37 receives the operation start instruction including the instance name of the virtual system X from the system managing section 32 and starts the operation of the designated instance of the virtual system X and outputs the operation start notification including the instance name of the virtual system X to the system managing section 32 (step S63). Notably, because the processing for starting the operation of the virtual system itself is similar to those in the past, further descriptions thereon will be omitted herein. For example, a process that receives a processing request from an external network (such as an httpd and ftpd) may be started. The state on the corresponding record is changed to "in service" on the system deployment state table 38.

The system managing section 32 receives the operation start notification including the instance name of the virtual system X from the logical system deploying section 37 and transmits the operation start notification including the instance name of the virtual system X to the service operation manager terminal 1 through the I/F 31 (step S65). The service operation manager terminal 1 receives the operation start notification including the instance name of the virtual system X from the virtual system deployment and test control apparatus 3 and displays it on the display device (step S67). In this way, the service operation manager can recognize that the operation of the virtual system X has been started without problems. The processing moves to the processing in FIG. 21 through the terminal G.

Figure 21:
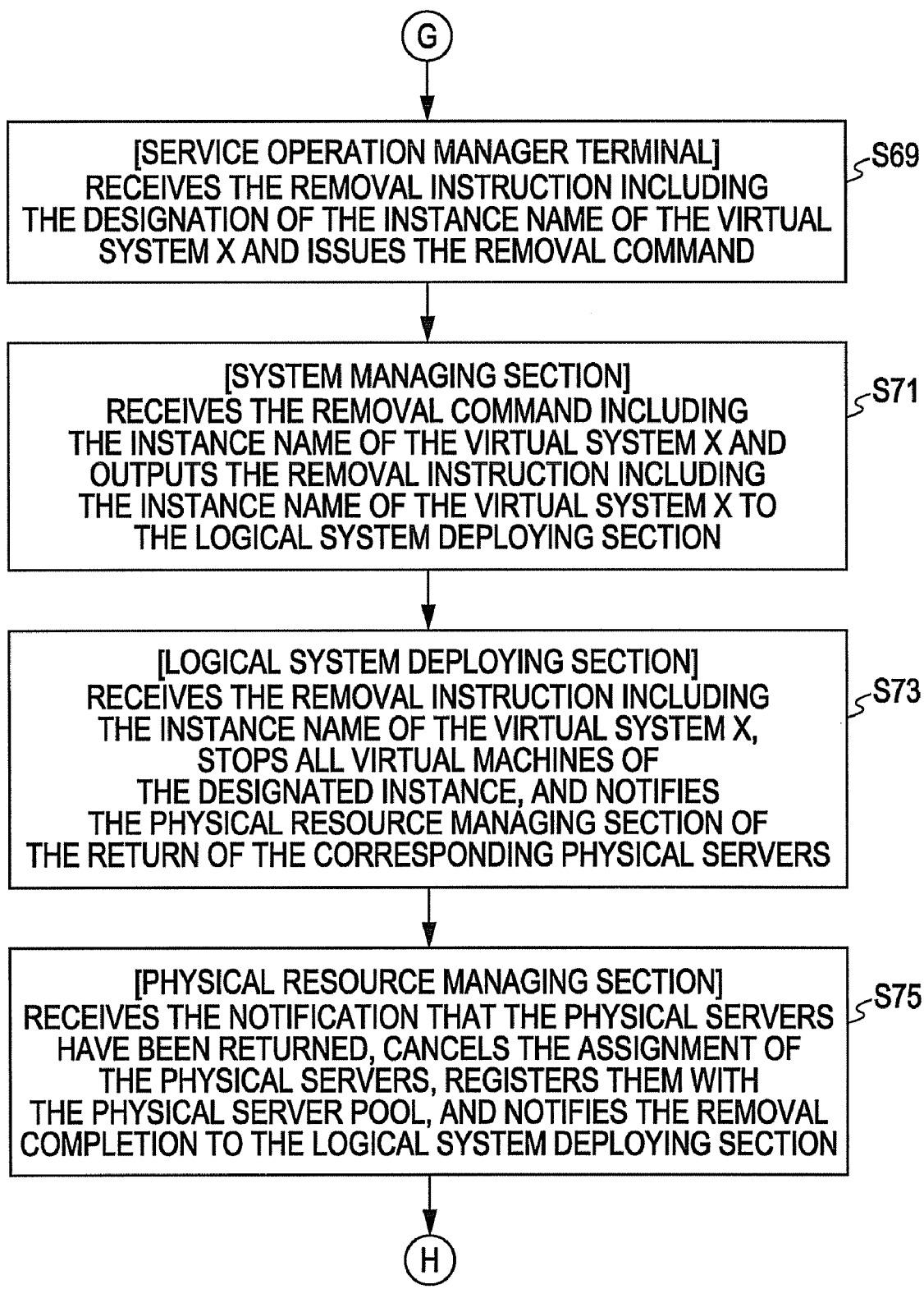
FIG. 21 is a diagram illustrating a processing flow assumed according to the embodiment.
Figure 22:
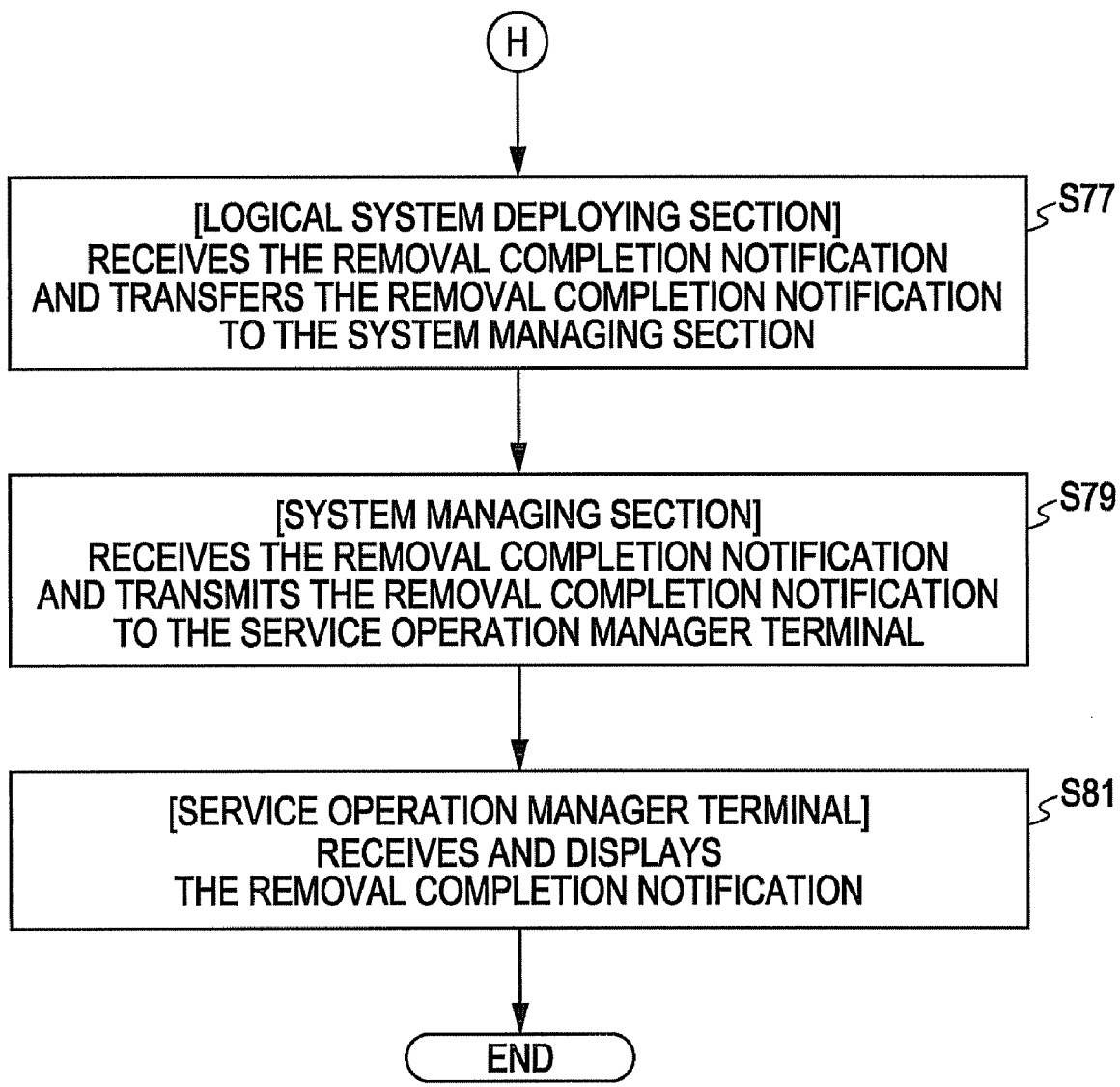
FIG. 22 is a diagram illustrating a processing flow assumed according to the embodiment.
Figure 23:
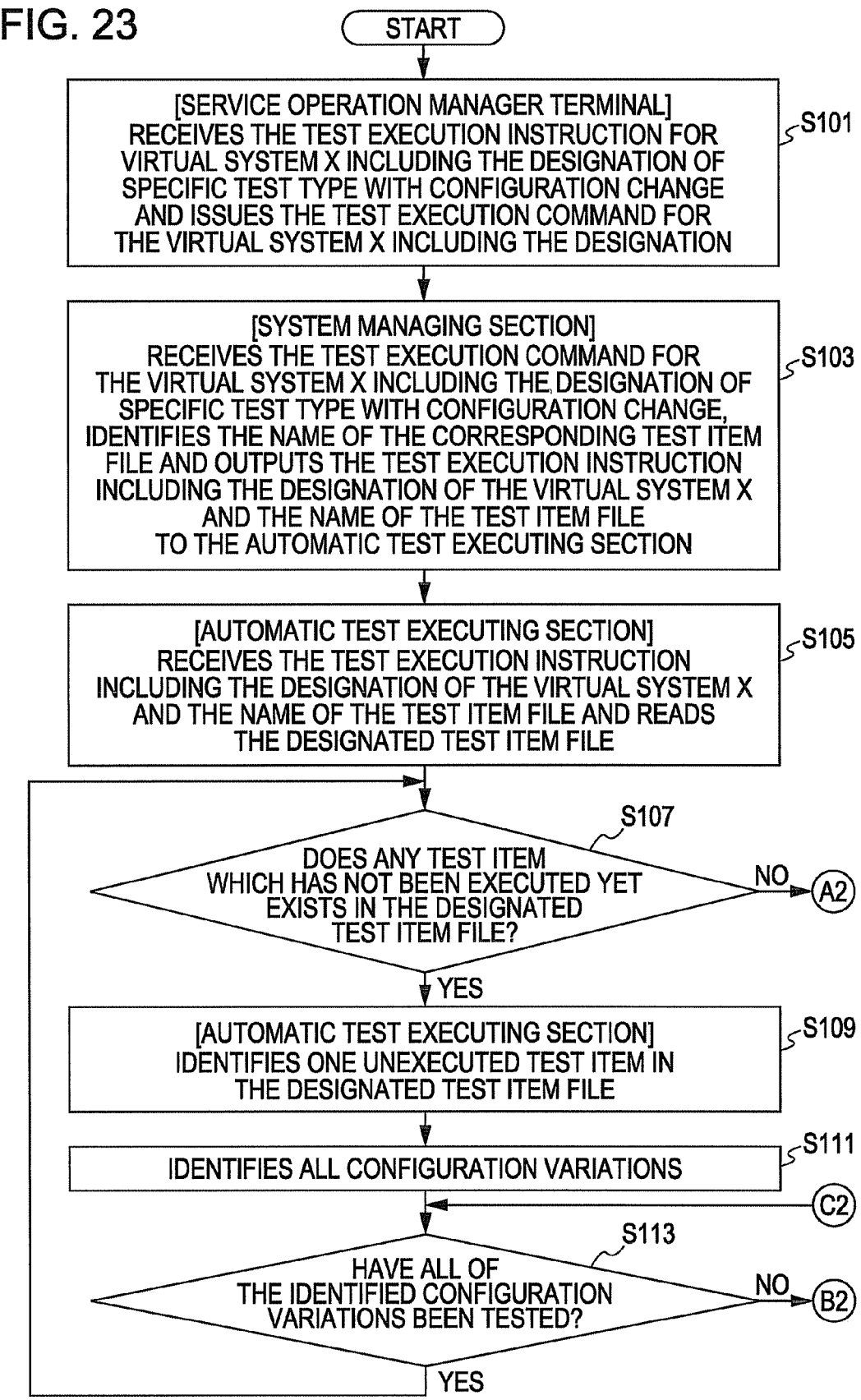
FIG. 23 is a diagram illustrating a processing flow according to the embodiment.

For example, after the test ends or after the operation is stopped for maintenance, the processing in FIG. 21 is performed. First of all, a service operation manager inputs a removal instruction including the designation of the instance name of the virtual system X to the service operation manager terminal 1. The service operation manager terminal 1 receives the removal instruction including the designation of the instance name of the virtual system X and issues the removal command including the instance name of the virtual system X to the virtual system deployment and test control apparatus 3 (step S69).

The system managing section 32 the removal command including the instance name of the virtual system X from the service operation manager terminal 1 through the I/F 31 and outputs the removal instruction including the instance name of the virtual system X to the logical system deploying section 37 (step S71). The logical system deploying section 37 receives the removal instruction including the instance name of the virtual system X from the system managing section 32, stops all virtual machines of the designated instance, identifies the physical servers relating to the designated instance of the virtual system X in the system deployment state table 38 and notifies the physical resource managing section 42 of the return of the corresponding physical servers (step S73). Because the processing for stopping a virtual machine is similar to those in the past, further descriptions thereon will be omitted herein. Notably, the state on the corresponding record is changed to "in removal" on the system deployment state table 38.

The physical resource managing section 42 receives the notification that the physical servers have been returned from the logical system deploying section 37, cancels the assignment of the physical servers, registers them with the physical server pool 5 as free physical servers, and notifies the removal completion to the logical system deploying section 37 (step S75). The processing moves to the processing in FIG. 22 through the terminal H.

The logical system deploying section 37 receives the removal completion notification from the physical resource managing section 42 and transfers the removal completion notification to the system managing section 32 (step S77). Here, the corresponding record is deleted on the system deployment state table 38. The system managing section 32 receives the removal completion notification from the logical system deploying section 37 and transmits the removal completion notification to the service operation manager terminal 1 through the I/F 31 (step S79). The service operation manager terminal 1 receives the removal completion notification from the virtual system deployment and test control apparatus 3 and displays it on the display device (step S81). Thus, the service manager can recognize the completion of the removal.

As described above, the implementation of this embodiment allows smooth migration from the test system to the active system. Furthermore, because of the configuration of the test system that fills the differences from that of the active system, the test system can be migrated to the active system, without performing special setting if no problems are found. This can prevent setting errors and/or misoperations by a service operation manager. In addition, the physical server pool is shared therebetween, there is a higher possibility that malfunctions due to a small difference in version number between/among physical servers can be avoided.

Next, with reference to FIG. 23 to FIG. 30, processing details for performing a load test with a configuration change will be described. First of all, a service operation manager inputs a test execution instruction on a specific virtual system X including the designation of a specific test type (which is a load test here) with a configuration change to the service operation manager terminal 1. Then, the service operation manager terminal 1 receives the test execution instruction on the specific virtual system X including the designation as described above and issues the test execution command on the specific virtual system X including the designation as described above to the virtual system deployment and test control apparatus 3 (step S101). The I/F 31 in the virtual system deployment and test control apparatus 3 receives the test execution command for the virtual system X including the designation of a specific test type with a configuration change from the service operation manager terminal 1, identifies the file name for the test item file of the designated test type and designated virtual system X in the system management table 33, and outputs the test execution instruction including the designation of the virtual system X and the file name of the test item file to the automatic test executing section 41 (step S103). For example, "X-LoadTest.test" may be included in the test execution instruction.

The automatic test executing section 41 receives the test execution instruction including the designation of the virtual system X and the file name of the test item file, reads the designated test item file from the test item storage section 40 in accordance with the test execution instruction (step S105). In the example in FIG. 13, it is assumed that the test data of "load test with configuration change" on the virtual system X is read.

Then, the automatic test executing section 41 determines whether any test item which has not been executed yet exists in the designated test item file or not (step S107). If all test items in the designated item file are executed, the processing moves to the processing in FIG. 24 through the terminal A2. If some test items are not processed yet on the other hand, the automatic test executing section 41 one unexecuted test item in the designated test item file (step S109) and identifies all configuration variations of the identified test item and stores them to the storage device such as the main memory (step S111).

In the example in FIG. 13, because the test item LT001 defines the change in number of test-Clients from 10 to 100, 91 configuration variations with increments by one from 10 clients to 100 clients can be identified. Notably, the test-Clients become virtual machines to be additionally deployed in the test system. Here, because no configuration changes are defined for the active system, all configuration variations are kept with "default" settings.

The test item LT002 of the load test with a configuration change for the virtual system A defines the change in number of test-DB servers from one to three for the test system. In this case, the configuration variation with five Web servers for the active system and one test-DB servers for the test system, the configuration variation with five Web servers for the active system and two test-DB server for the test system, the configuration variation with five Web servers for the active system and three test-DB servers for the test system are identified. Such data on the configuration variations may be listed and be held in a storage device such as the main memory.

Then, the automatic test executing section 41 determines whether all of the identified configuration variations have been tested or not (step S113). If any unexecuted tests exist, the processing moves to the processing in FIG. 25 through the terminal 62. On the other hand, if all configuration variations are tested, the processing returns to step S107.

Figure 24:
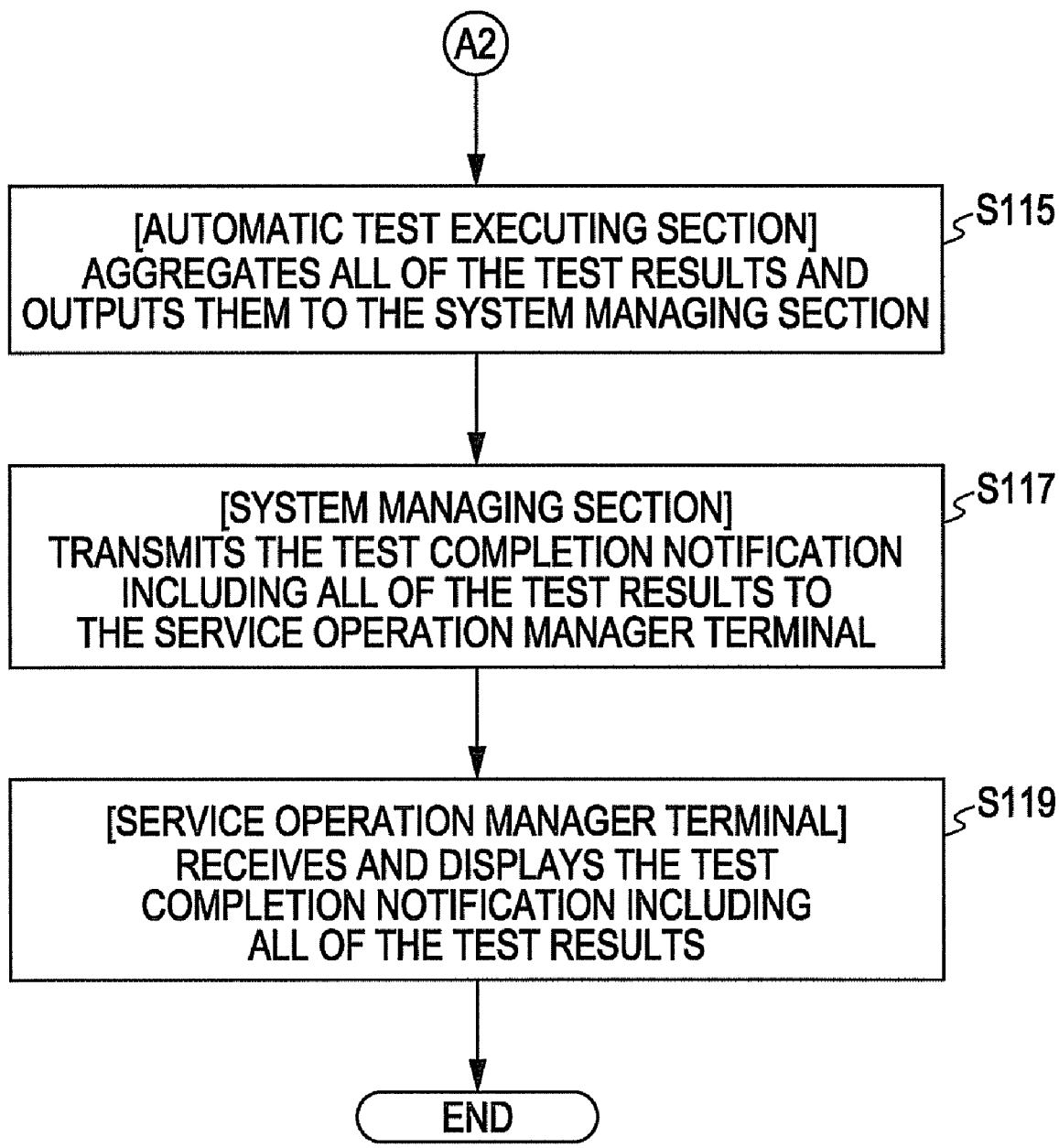
FIG. 24 is a diagram illustrating a processing flow according to the embodiment.
Figure 25:
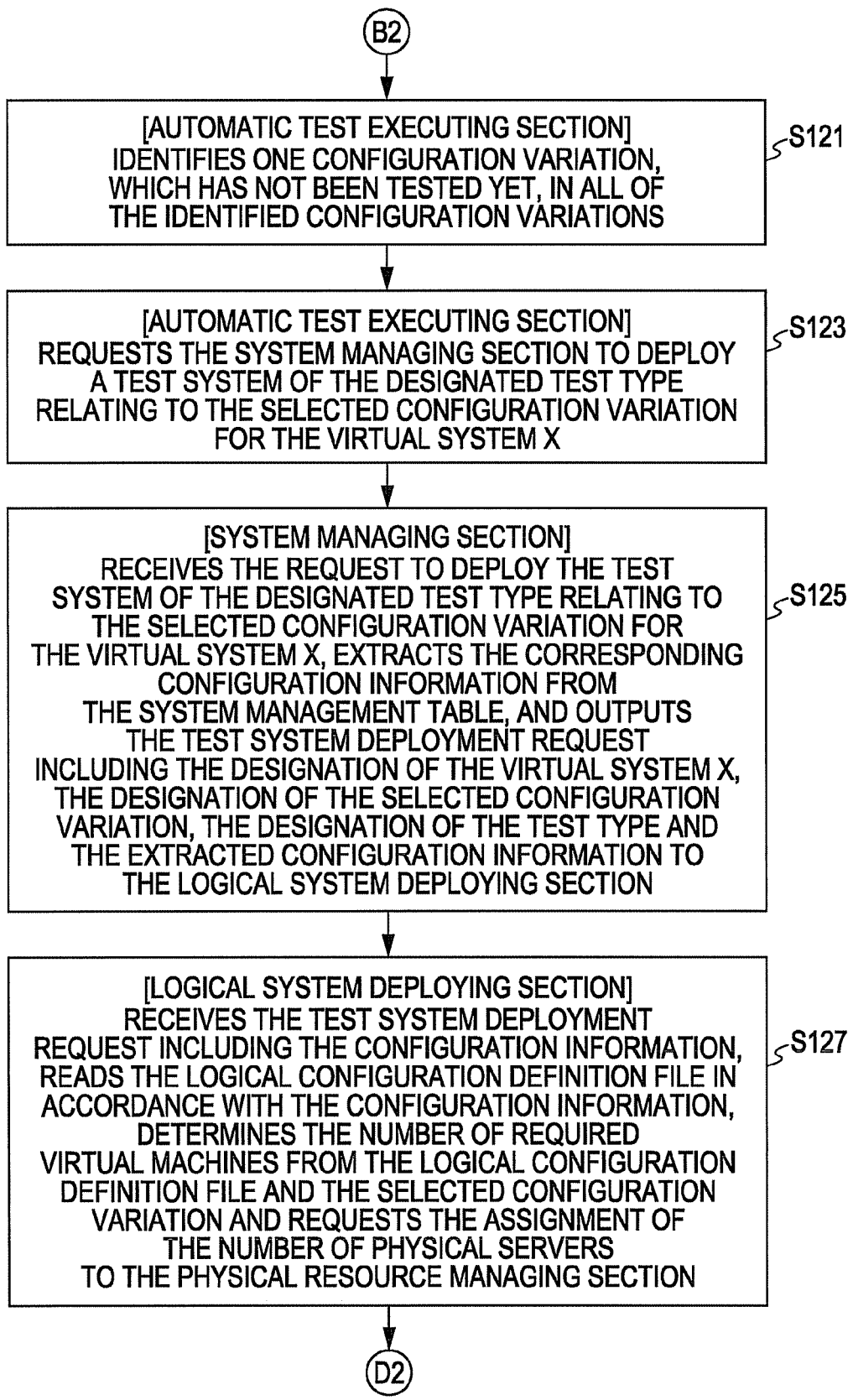
FIG. 25 is a diagram illustrating a processing flow according to the embodiment.

Next, the processing in the terminal A2 and subsequent stages will be described with reference to FIG. 24. The automatic test executing section 41 aggregates all of the test results stored in a storage device such as the main memory and outputs all of the test results to the system managing section 32 (step S115). The system managing section 32 receives all of the test results from the automatic test executing section 41 and transmits the test completion notification including all of the test results to the service operation manager terminal 1 through the I/F 31 (step S117). The service operation manager terminal 1 receives the test completion notification including all of the test results from the virtual system deployment and test control apparatus 3 and displays it on the display device (step S119).

Performing the processing can eliminate the necessity for the service operation manager to instruct to change the parameter for the configuration variations and can provide the test results regarding all configuration variations of a specific test with a configuration change.

Next, the processing in the terminal B2 and subsequent stages will be described with reference to FIG. 25 to FIG. 30. The automatic test executing section 41 identifies one configuration variation, which has not been tested yet, in all of the identified configuration variations (step S121). Then, the automatic test executing section 41 requests the system managing section 32 to deploy a test system of the designated test type regarding the selected configuration variation of the virtual system X (step S123). The request includes the number of a specific kind of virtual machines (such as five Web servers or "default" if not designated) required for the active system and the number of a specific kind of virtual machines (such as one test-DB server or "default" if not designated) required for the test system in addition to the configuration of the active system.

The system managing section 32 receives the request to deploy a test system of the designated test type relating to the selected configuration variation of the virtual system X from the automatic test executing section 41, extracts, from the system management table 33, the file name of the logical configuration definition file for an active system of the virtual system X, the file name of the VM image file, the file name of the logical configuration change definition file and the file name of the test driver VM image file (which will also be called configuration information), and outputs the test system deployment request including the designation of the virtual system X, the designation of the selected configuration variation, the designation of the test type and the configuration information to the logical system deploying section 37 (step S125).

The logical system deploying section 37 receives the test system deployment request including the designation of the virtual system X, the designation of the selected configuration variation, the designation of the test type and the configuration information from the system managing section 32, reads the corresponding logical configuration definition file from the system logical configuration storage section 34 in accordance with the file name of the logical configuration definition file included in the configuration information, determines the required number of virtual machines from the logical configuration definition file and selected configuration variation (which is the required number of virtual machines of the specific type for the active system, determines the required number of physical servers for the virtual machines, and requests the assignment of the number of physical servers to the physical resource managing section 42 (step S127). For example, if the selected configuration variation includes the data "default" for the active system, the default number of virtual machines are deployed in the logical configuration definition file. On the other hand, if the data describing five Web servers is included therein, five Web servers for the active system are deployed, rather than the default number of Web servers in the logical configuration definition file. As illustrated in FIG. 7, because plural kinds of virtual machines are deployed, the number of physical machines for each kind is determined. The number of physical machines required for a virtual machine is determined in accordance with a technology in the past.

The logical system deploying section 37 further adds a record relating to the received deployment instruction on the system deployment state table 38. For example, regarding the deployment of the test system of the virtual system X, records "X-Test 01" as the instance name of the virtual system, "undecided" for physical servers, and "in deployment" as the state are added. The processing moves to the processing in FIG. 26 through the terminal D2.

Figure 26:
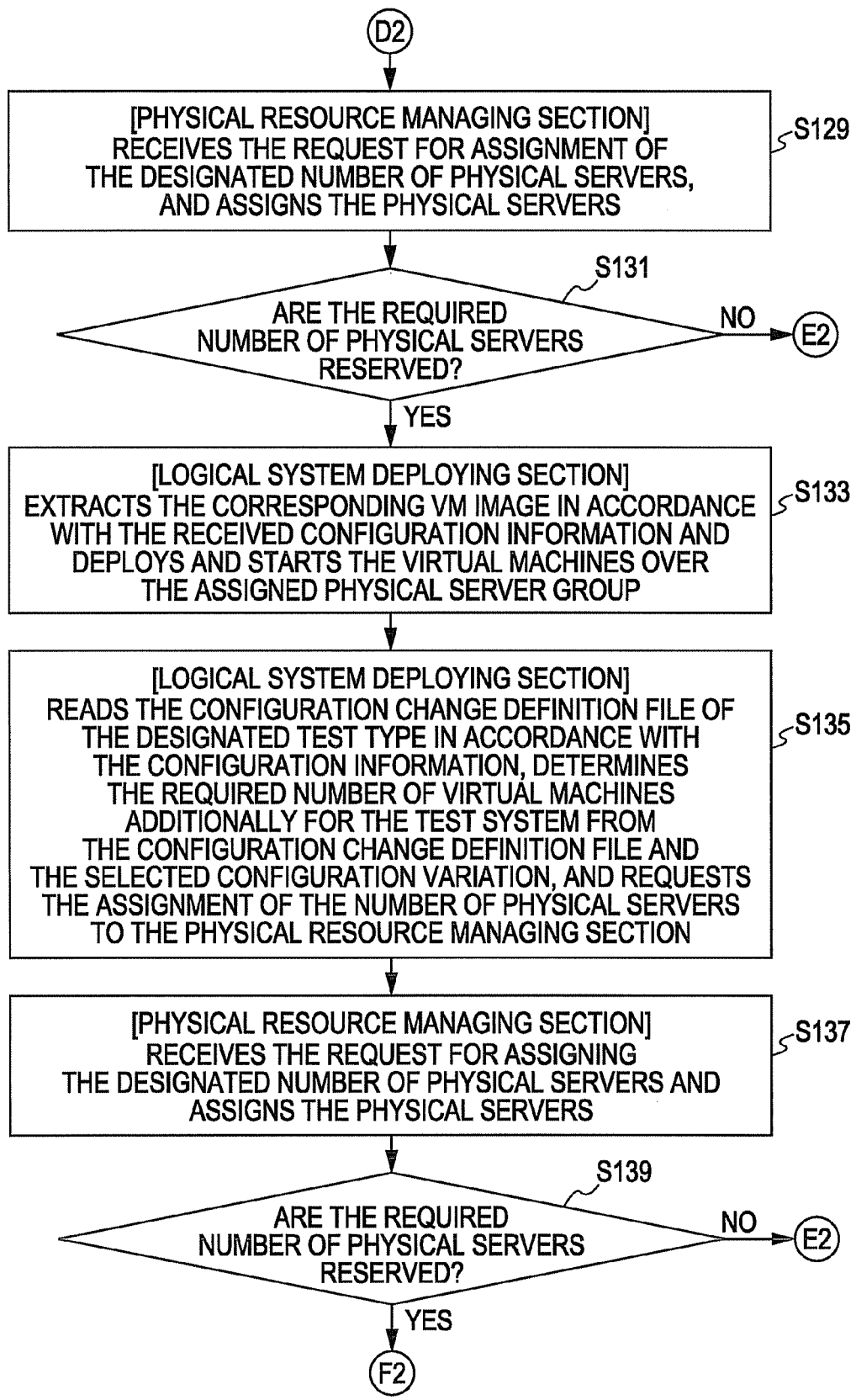
FIG. 26 is a diagram illustrating a processing flow according to the embodiment.

Moving on to the description on the processing in FIG. 26, the physical resource managing section 42 receives the request for assigning physical servers from the logical system deploying section 37, and, in accordance with the request, assigns physical servers in the physical server pool 5 (step S129). Because the processing itself is similar to that in the past, further description thereon will be omitted herein. Notably, if the required number of physical servers are reserved, which physical servers are reserved is notified to the logical system deploying section 37. The logical system deploying section 37 stores the names of the reserved physical servers to the corresponding records on the system deployment state table 38.

If the required number of physical servers are not reserved (step S131: No), the processing moves to the processing in FIG. 27 through the terminal E2. On the other hand, if the required number of physical servers are reserved (step S131: Yes), the logical system deploying section 37 extracts the corresponding VM image file from the VM image repository 35 in accordance with the file name of the VM image file included in the received configuration information and loads the VM image on to the assigned physical servers in accordance with the number of virtual machines defined in the logical configuration definition file and the number of virtual machines included in the selected configuration variation (which is the number of virtual machines for the active system) to deploy and start the virtual machines thereby (step S133). Thus, the start of a part of the virtual machines completes.

The logical system deploying section 37 further reads the corresponding logical configuration change definition file from the system logical configuration change storage section 36 in accordance with the file name of the logical configuration change definition file included in the configuration information, determines the required number of virtual machines additionally for the active system from the logical configuration change definition file and the selected configuration variation (such as the additionally required number of virtual machines of the specific type for the test system), determines the additionally required number of physical servers for the virtual machines, and requests the assignment of the number of physical servers to the physical resource managing section 42 (step S135).

The physical resource managing section 42 receives the request for assigning physical servers from the logical system deploying section 37 and, in accordance with the request, assigns the physical servers in physical server pool 5 (step S137).

If the required number of physical servers are not reserved (step S139: No), the processing moves to the processing in FIG. 27 through the terminal E2. On the other hand, if the required number of physical servers are reserved (step S139: Yes), the processing moves to the processing in FIG. 28 through the terminal F2.

Figure 27:
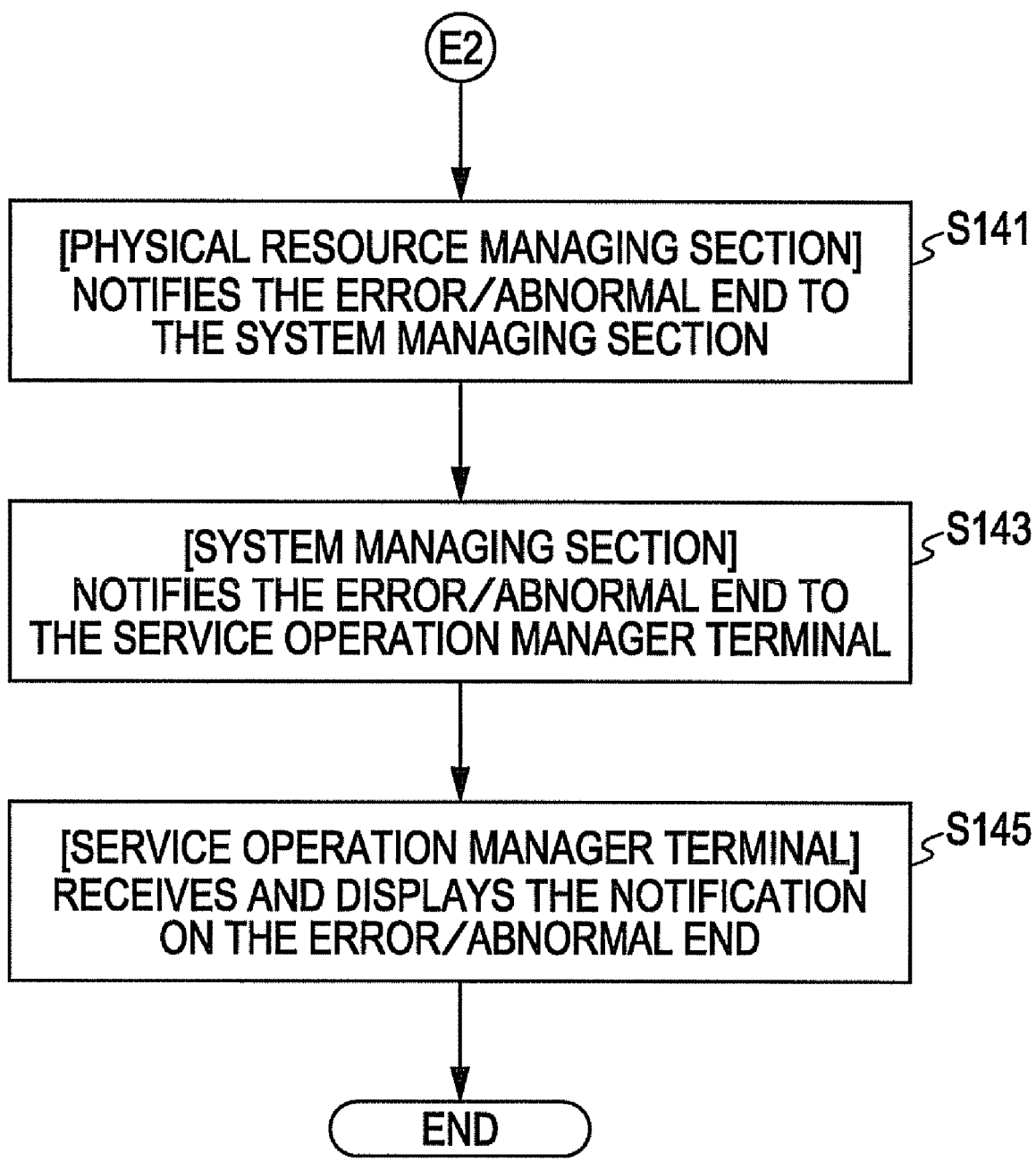
FIG. 27 is a diagram illustrating a processing flow according to the embodiment.

Next, the processing in the terminal E2 and subsequent stages will be described with reference to FIG. 27. If the required number of physical servers are not reserved, the physical resource managing section 42 notifies the error/abnormal end to the system managing section 32 through the logical system deploying section 37 (FIG. 27/step S141). Notably, the already reserved physical servers are released. If the logical system deploying section 37 receives an error/abnormal end, the logical system deployment section 37 transfers it to the system managing section 32 and deletes the corresponding record on the system deployment state table 38. The system managing section 32 notifies the error/abnormal end to the service operation manager terminal 1 through the I/F 31 (step S143). The service operation manager terminal 1 receives the notification on the error/abnormal end from the virtual system deployment and test control apparatus 3 and displays it on the display device, for example, to notify it to the service operation manager (step S145). Then, the processing ends.

Figure 28:
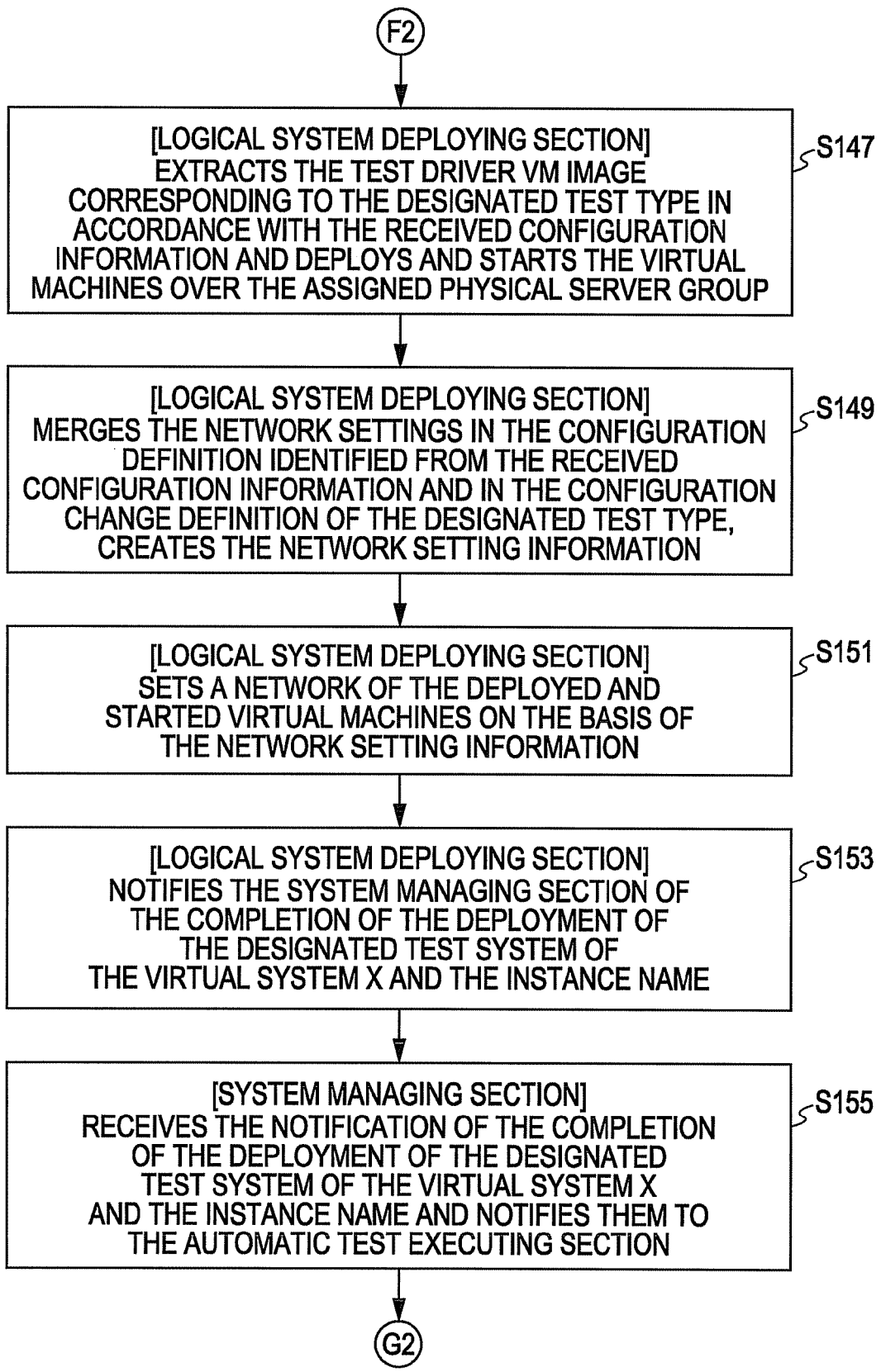
FIG. 28 is a diagram illustrating a processing flow according to the embodiment.

Next, with reference to FIG. 28 to FIG. 30, the processing in the terminal F2 and subsequent stages will be described. The logical system deploying section 37 extracts the corresponding test driver VM image file from the test driver VM image repository 39 in accordance with the file name of the test driver VM image file included in the configuration information and loads the test driver VM image onto the assigned physical servers in accordance with the number of virtual machines defined in the logical configuration change definition file and the number of virtual machines included in the selected configuration variation (such as the additionally required number of virtual machines of the specific type for the test system) to deploy and start the virtual machines thereby (step S147).

The logical system deploying section 37 further merges the network setting description in the logical configuration definition file identified from the configuration information and the network setting description in the logical configuration change definition file of the designated test type, creates the network setting information for the test system, and stores it in a storage device such as the main memory (step S149).

The logical system deploying section 37 sets a network of the deployed and started virtual machines on the basis of the network setting information created in step S149 (step S151). Thus, the intended logical system 51 is established over the physical server pool 5. Therefore, the state on the corresponding record on the system deployment state table 38 is changed to the state of deployment completed. Notably, because details of the processing are similar to those in the past, further descriptions thereon will be omitted herein.

Then, the logical system deploying section 37 notifies the system managing section 32 of the completion of the deployment of the virtual system X and the instance name (step S153). At that time, the state on the record on the system deployment state table 38 is changed to "in test". The system managing section 32 receives the notification of the completion of the completion of the deployment of the designated test system of the virtual system X and the instance name from the logical system deploying section 37 and notifies them to the automatic test executing section 41 (step S155). The processing moves to the processing in FIG. 29 through the terminal G2.

Figure 29:
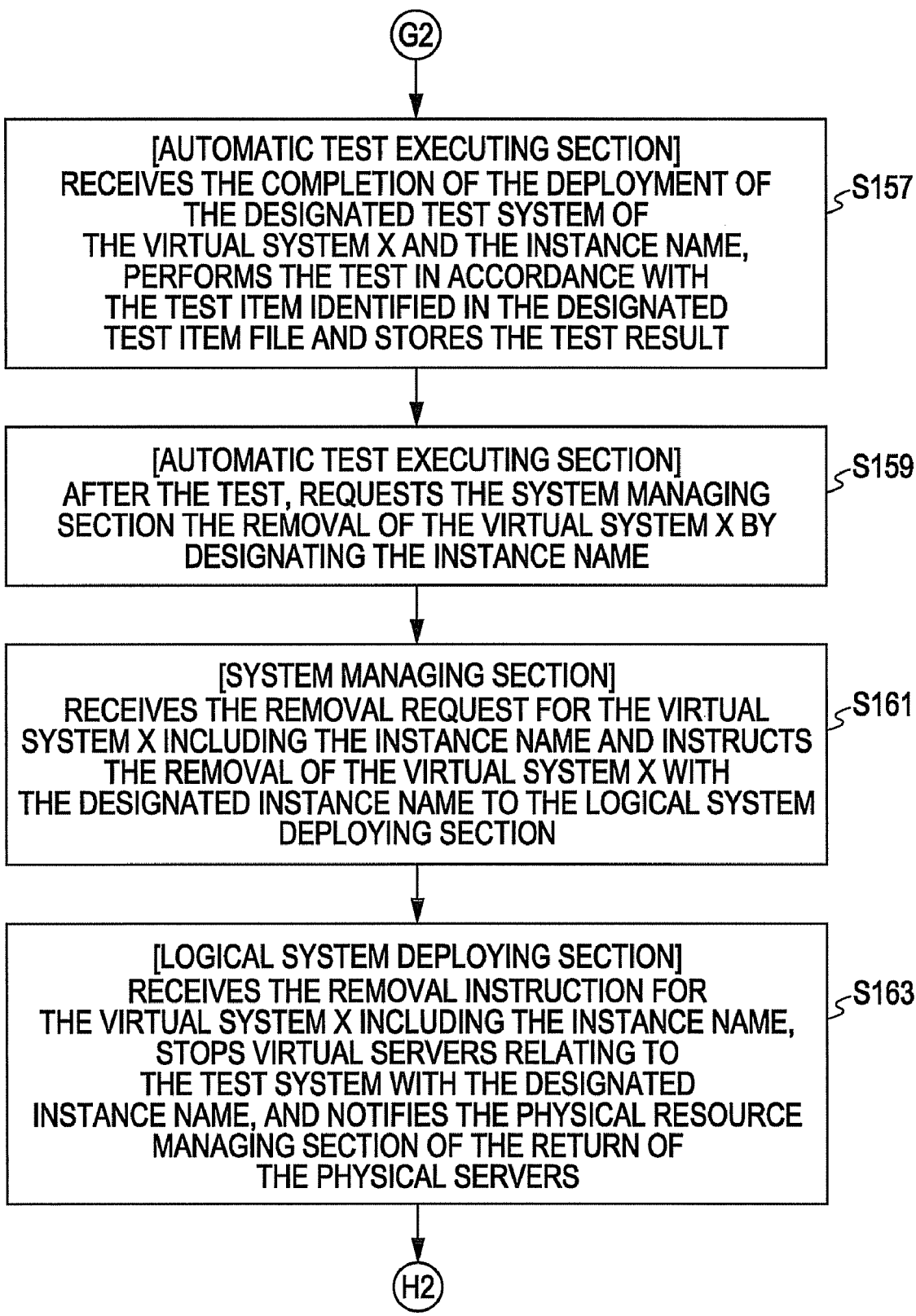
FIG. 29 is a diagram illustrating a processing flow according to the embodiment.

Moving on to the description on the processing in FIG. 29, the automatic test executing section 41 receives the completion of the deployment of the designated test system of the virtual system X and the instance name from the system managing section 32, performs the test on the test system identified by the received instance name in accordance with the test item identified in step S109 in the designated test item file and stores the test result in a storage device such as the main memory (step S157). Because performing processing itself in accordance with the corresponding test item file is similar to that in the past, further description thereon will be omitted herein.

The automatic test executing section 41 after the test requests the system managing section 32 the removal of the virtual system X by designating the instance name (step S159). The system managing section 32 receives the removal request including the instance name of the virtual system X from the automatic test executing section 41 and outputs the removal instruction including the instance name of the virtual system X to the logical system deploying section 37 (step S161). The logical system deploying section 37 receives the removal instruction including the instance name of the virtual system X from the system managing section 32, stops all virtual machines of the designated instance, identifies the physical servers for the designated instance of the virtual system X on the system deployment state table 38 and notifies the physical resource managing section 42 of the return of the physical servers (step S163). Because the processing for stopping a virtual machine is similar to that in the past, further description thereon will be omitted herein. Here, the state on the corresponding record on the system deployment state table 38 is changed to "in removal". The processing moves to the processing in FIG. 30 through the terminal H2.

Figure 30:
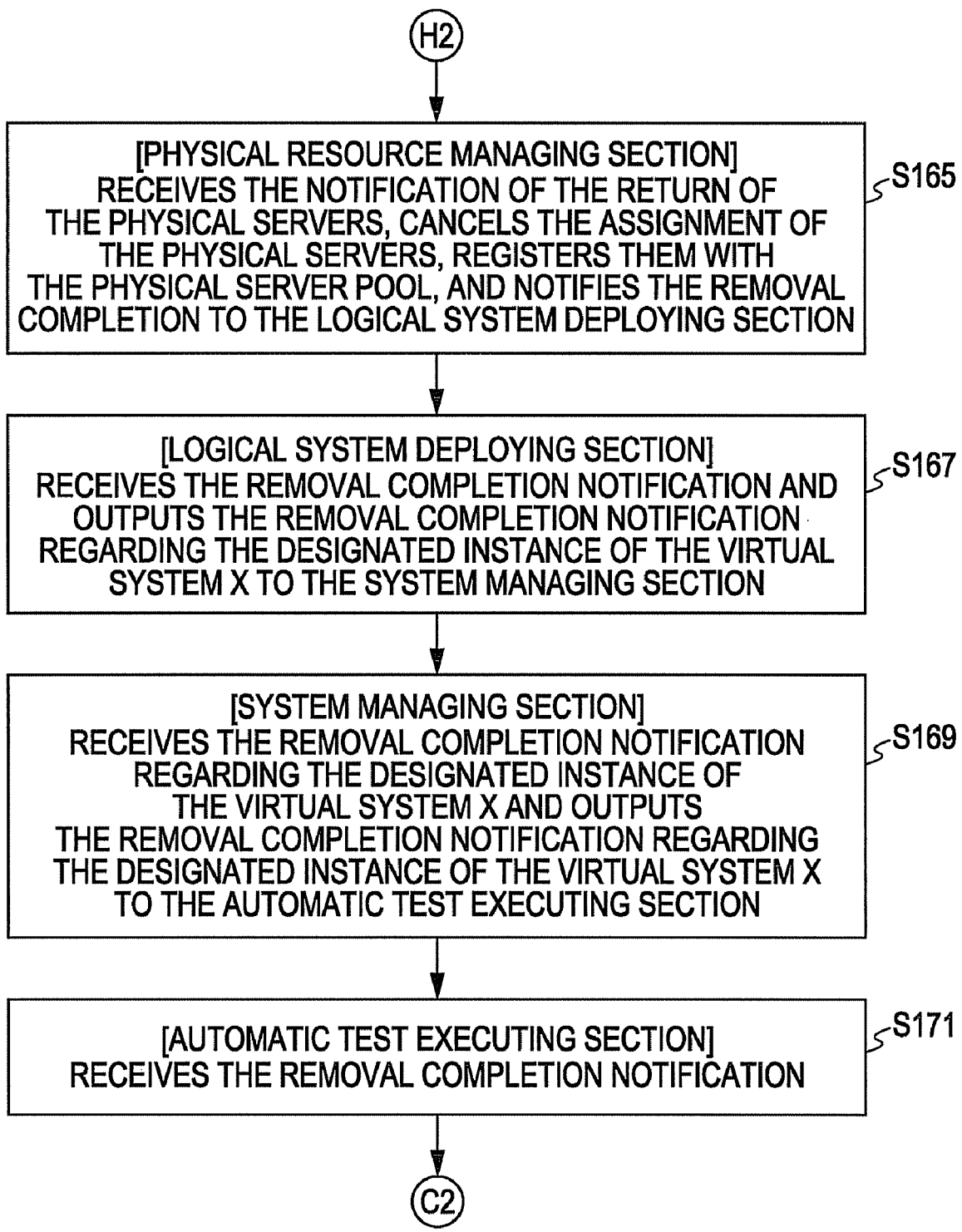
FIG. 30 is a diagram illustrating a processing flow according to the embodiment.

Moving on to the description on the processing in FIG. 30, the physical resource managing section 42 receives the notification of the return of the physical servers from the logical system deploying section 37, cancels the assignment of the physical servers, registers them as free physical servers with the physical server pool 5, and notifies the removal completion to the logical system deploying section 37 (step S165).

The logical system deploying section 37 receives the removal completion notification from the physical resource managing section 42 and outputs the removal completion notification regarding the designated instance of the virtual system X to the system managing section 32 (step S167). Here, the corresponding record is deleted on the system deployment state table 38. The system managing section 32 receives the removal completion notification regarding the designated instance of the virtual system X from the logical system deploying section 37 and outputs the removal completion notification to the automatic test executing section 41 (step S169). The automatic test executing section 41 receives the removal completion notification regarding the designated instance of the virtual system X from the system managing section 32 (step S171). Then, the processing returns to step S113 in FIG. 23 through the terminal C2.

Thus, for each configuration variation, a test system reflecting the configuration variation is deployed. Then, the configuration variation can be tested, and the test result can be automatically acquired. A service operation manager may only be required to instruct the implementation of the test, and the automatic test executing section 41 automatically recognizes the configuration variations and tests all of them. This can increase the efficiency of the test implementation and prevent operation errors such as a setting error by the service operation manager.

Having described the embodiment of the present technology up to this point, the present technology is not limited thereto. For example, the functional block diagram of the virtual system deployment and test control apparatus 3 illustrated in FIG. 4 is for illustration purposes only, and the illustrated configuration may not agree with a real program module configuration. The system managing section 32, logical system deploying section 37 and physical resource managing section 42 may be integrated to function as a control section. Also in each of the processing flows described above, the order of the steps may be changed or the steps may be performed in parallel, as long as the same processing result can be acquired.

Figure 31:
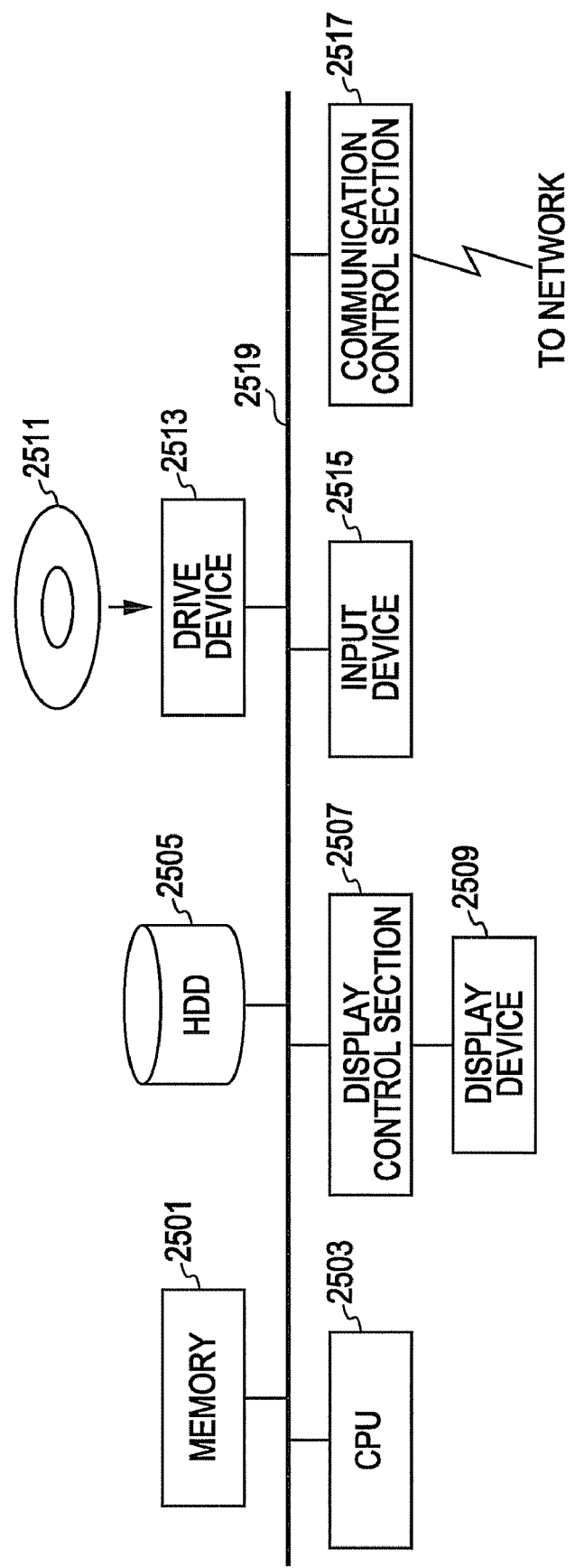
FIG. 31 is a functional block diagram of a computer.

The physical servers in the physical server pool, the service operation manager terminal 1 and the virtual system deployment and test control apparatus 3 are computer apparatus, and, as illustrated in FIG. 31, a memory 2501, a CPU 2503, a hard disk drive (HDD) 2505, a display control section 2507 connecting to a display device 2509, a drive device 2513 for a removable disk 2511, an input device 2515, and a communication control section 2517 for connecting to a network are connected via a bus 2519. The operating system (OS) and an application program for performing processing according to the embodiment are stored in the HDD 2505. In order to execute them by the CPU 2503, they are read from the HDD 2505 to the memory 2501. The CPU 2503 controls the display control section 2507, communication control section 2517, drive device 2513 as required so as to perform a required operation. The data being processed is stored in the memory 2501 and is stored to the HDD 2505 as required. According to an embodiment of the present technology, the application program for implementing the aforesaid processing may be stored and is distributed in a computer-readable removable disk 2511 and be installed from the drive device 2513 to the HDD 2505. The application program may be installed over a network such as the Internet and through the communication control section 2517 to the HDD 2505. Those computer apparatus implement the functions as described above with the organic cooperation between hardware such as the CPU 2503 and the memory 2501 and the OS and the required application programs.

The memory 2501 or the HDD 2505 of the test control apparatus 3, for example, stores configuration information of the test system and test information (test item). The CPU 2503 (processor) of the test control apparatus 3, for example, executes a process including: activating the test system to execute test on the subsystem, collecting test information from the test system, and storing the test result information in the memory while the subsystem has the same configuration as the existing system, confirming the test system has been modified so that the subsystem has the same configuration as the modified system, and activating the test system to execute test on the subsystem, collecting test result information from the test system, and storing the test result information in the memory while the subsystem has the same configuration as the modified system.

The memory 2501 or the HDD 2505 of the test control apparatus 3, for example, stores the differences from the existing system are defined for the test system. The CPU 2503 (processor) of the test control apparatus 3, for example, executes a process including determining whether the required number of computers are reserved. The CPU 2503 (processor) of the test control apparatus 3, for example, executes a process including activating the test system for each test items.

The embodiments may be summarized as follows:

A virtual system control method includes a step (a) of receiving a test request that requests to perform a test of a specific type on plural configuration variations of a test system of a specific virtual system in a physical server pool in which active and test virtual systems can be deployed, a virtual machine identifying step (b) of identifying first number-of-virtual-machine data and second number-of-virtual-machine data, the first number-of-virtual-machine data describing the number of at least partial kinds of virtual machines for the active system, which are required for an unprocessed specific configuration variation of the plural configuration variations and the second number-of-virtual-machine data describing the number of at least partial kinds of virtual machines, which are additionally required to the virtual machines for the active system, in the test system for the test of the specific type, an active system deploying step (c) of using server configuration data in the configuration information on the active system of the specific virtual machine, the first number-of-virtual-machine data, and a virtual machine image for the active system of the specific virtual system to start the virtual machines required for the active system of the specific virtual system in the physical server pool, a test system deployment step (d) of using server configuration data in configuration change information, which is the configuration information of the difference between the active system of the specific virtual system and the test system of the specific type, the second number-of-virtual-machine data, a virtual machine image of the configuration of the difference between the active system of the specific virtual system and the test system of the specific type to start virtual machines to be added to the active system of the specific virtual system in the physical server pool, a network setting step (e) of setting a network of the started virtual machines in accordance with network configuration data created by merging network setting information among virtual machines and network setting information describing the difference in network between the active system of the specific virtual system and the test system of the specific type in the configuration change information, and a testing step (f) of performing the test of the specific type on the test system according to the specific configuration variation.

In this way, even when plural configuration variations are to be tested, unprocessed configuration variations are automatically identified, and the test systems reflecting the configuration variations are automatically deployed. This can reduce the time and effort of a service operation manager, increases the test efficiency and reduces the number of setting errors by the service operation manager.

The virtual system control method may further include a stopping step of stopping virtual machines being active in the physical server pool when a test of a specific type ends and returning the physical servers relating to the virtual machines to the physical server pool and the step of repeating the virtual machine identifying step through the stopping step until all of the plural configuration variations are processed. Because all of the plural configuration variations are autonomously tested in that way, the time and effort of a service operation manager can be greatly reduced.

The virtual system control method may further include the step of extracting test data on a test of a specific type from a test data storage section that stores test data on tests including at least one of a first configuration range for virtual machines of the active system and a second configuration range for virtual machines to be added in the test system and identifying the configuration variation including data describing the number of virtual machines of at least partial kinds of the active system or a default setting therefor and the data describing the number of virtual machines of partial kinds, which are required in addition to the virtual machines for the active system, in the test system or a default setting therefor for a test of a specific type from combinations of the configuration ranges included in the test data. Thus, because the configuration variations themselves to be tested can be automatically recognized, they can be tested without omission.

The active system deployment step may include a configuration information identifying step of identifying the configuration information regarding the active system of a specific virtual system relating to the test request, the step of reserving a first physical server that can be deployed in the physical server pool in accordance with the server configuration data and first number-of-virtual-machine data included in the identified configuration information, and a first virtual machine starting step of identifying a virtual machine image for the active system of a specific virtual system and starting the virtual machine over a reserved first physical server group on the basis of the virtual machine image.

The test system deployment step may include a configuration change definition information identifying step of identifying the configuration change definition information on the test system of a specific type for a specific virtual system, the step of reserving a second physical server group, which can be deployed in the physical server pool, in accordance with the server configuration data and second number-of-virtual-machine data included in the configuration change definition on the test system of a specific type for a specific virtual system and a second virtual machine starting step of identifying the virtual machine image on the configuration of the difference between the active system of a specific virtual system and the test system of a specific type and starting the virtual machine over the reserved second physical server group on the basis of the virtual machine image.

The network setting step may include deleting an item, which is to be deleted from the network configuration information included in the configuration information of the network setting information included in the configuration change information, from the network setting information included in the configuration information and adding an item, which is to be added to the network setting information included in the configuration information of the network setting information included in the configuration change information, to the network setting information included in the configuration information.

The virtual machine deployment and test control unit includes a configuration information storage section that stores configuration information on an active system for a virtual system, a first virtual machine image storage section that stores a virtual machine image for the active system for a virtual system, a configuration change information storage section that stores configuration change information, which is the configuration information of the difference between an active system and test system for a virtual system, a second virtual machine image storage section that stores a virtual machine image regarding the configuration of the difference between an active system and test system for a virtual machine, a test data storage section that stores test data on a test of a specific type on plural configuration variations in a test system for a virtual system, a control section, and an automatic test executing section.

The control section receives a test request that requests to perform a test of a specific type on a test system of a specific virtual system in a physical server pool in which active and test virtual systems can be deployed and requests an automatic test executing section to perform the test of the specific type on the test system of the specific virtual system. In response thereto, the automatic test executing section identifies first number-of-virtual-machine data and second number-of-virtual-machine data from the test data relating to the test of the specific type, which is stored in the test data storage section. The first number-of-virtual-machine data describes the number of at least partial kinds of virtual machines for the active system, which are required for an unprocessed specific configuration variation of the plural configuration variations, and the second number-of-virtual-machine data describing the number of at least partial kinds of virtual machines, which are additionally required to the virtual machines for the active system, in the test system for the test of the specific type. Then, the automatic test executing section outputs a request to deploy the test system of the specific virtual system, which includes the first number-of-virtual-machine data and the second number-of-virtual-machine data, to the control section. The control section uses server configuration data in the configuration information of the active system of the specific virtual machine, which is identified in the configuration information storage section, the first number-of-virtual-machine data, and a virtual machine image for the active system of the specific virtual system in the first virtual machine image storage section to start the virtual machines required for the active system of the specific virtual system in the physical server pool. The control section further uses server configuration data in the configuration change information, which is the configuration information of the difference between the active system of the specific virtual system and the test system of the specific type, which is identified in the configuration change information storage section, the second number-of-virtual-machine data, a virtual machine image for the configuration of the difference between the active system of the specific virtual system and the test system of the specific type in the second virtual machine image storage section to start the virtual machines to be added to the active system of the specific virtual system in the physical server pool. Then, the control section sets a network of the started virtual machines in accordance with network configuration data created by merging network setting information among virtual machines in the configuration information and network setting information describing the difference in network between the active system of the specific virtual system and the test system of the specific type in the configuration change information. After that, the control section notifies the automatic test executing section of the completion of the deployment. In response thereto, the automatic test executing section performs the test of the specific type in accordance with the test data relating to the test of the specific type, which is stored in the test data storage section.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

What is claimed is:

1. An apparatus for evaluating a change of an existing system to a modified system by using a test system including a subsystem having the same configuration with either of the existing system and the modified system, the apparatus comprising:
    a memory; and
    a processor for executing a process including:
        activating the test system using computers selected from a pool of computers from which computers for the existing system are selected while the existing system is in operation, collecting test result information from the test system, and storing the test result information in the memory while the subsystem has the same configuration as the existing system,
        confirming the test system has been modified so that the subsystem has the same configuration as the modified system, and
        activating the test system while the existing system is in operation, collecting test result information from the test system, and storing the test result information in the memory while the subsystem has the same configuration as the modified system.

2. The apparatus according to claim 1, wherein the memory stores differences from the existing system are defined for the test system.

3. The apparatus according to claim 1, wherein the process includes determining whether the number of computers to use for the test system are reserved.

4. The apparatus according to claim 1, wherein the process includes activating the test system for each test items.

5. A method for controlling an apparatus for evaluating a change of an existing system to a modified system by using a test system including a subsystem having the same configuration with either of the existing system and the modified system, the apparatus including a memory and a processor, the method comprising:

activating the test system using computers selected from a pool of computers from which computers for the existing system are selected while the existing system is in operation, collecting test result information from the test system, and storing the test result information in the memory while the subsystem has the same configuration as the existing system by the processor;
    confirming the test system has been modified so that the subsystem has the same configuration as the modified system by the processor; and
    activating the test system while the existing system is in operation, collecting test result information from the test system, and storing the test result information in the memory by the processor while the subsystem has the same configuration as the modified system.

6. The method according to claim 5, further comprising determining whether the number of computers to use for the test system are reserved.

7. The method according to claim 5, further comprising activating the test system for each test items.

8. A method comprising:
    selecting a first set of computers from a group of computers as components of a system;
    selecting a second set of computers from the group of computers as additional components for testing the system;
    testing the system formed by the first set of computers using the second set of computers while the first set of computers is active as the system; and
    deploying the tested system in the first set of computers as an active system.

9. An apparatus comprising:
    a processor to perform a procedure, the procedure comprising:
        selecting a first set of computers from a group of computers as components of a system and selecting a second set of computers from the group of computers as additional components for testing the system;
        testing the system formed by using the first set of computers using the second set of computers while the first set of computers is active as the system; and
        deploying the tested system in the first set of computers as an active system.

10. An apparatus for evaluating a change of an existing system to a modified system by using a test system including a subsystem having the same configuration with either of the existing system and the modified system, the test system including a plurality of computers connected with each other via a network, the apparatus comprising:
    a memory for storing configuration information of the test system and test information; and
    a processor for executing a process including:
        activating the test system to execute test on the subsystem, collecting test information from the test system, and storing the test result information in the memory while the subsystem has the same configuration as the existing system,
        confirming the test system has been modified so that the subsystem has the same configuration as the modified system,
        activating the test system to execute test on the subsystem, collecting test result information from the test system, and storing the test result information in the memory while the subsystem has the same configuration as the modified system, and
        determining whether the number of computers to use for the test system are reserved.

11. A method for controlling an apparatus for evaluating a change of an existing system to a modified system by using a test system including a subsystem having the same configuration with either of the existing subsystem and the modified system, the test system including a plurality of computers connected with each other via a network, the apparatus including a memory for storing configuration information of the test system and test information and a processor, the method comprising:

activating the test system to execute test on the subsystem, collecting test information from the test system, and storing the test result information in the memory while the subsystem has the same configuration as the existing system by the processor;

confirming the test system has been modified so that the subsystem has the same configuration as the modified system by the processor;

activating the test system to execute test on the subsystem while the subsystem has the same configuration as the modified system, collecting test result information from the test system, and storing the test result information in the memory by the processor; and determining whether the number of computers to use for the test system are reserved.

* * * * *